United States Patent
Ikeda et al.

(10) Patent No.: US 8,849,625 B2
(45) Date of Patent: Sep. 30, 2014

(54) DISTRIBUTED PROCESS SIMULATOR

(75) Inventors: Takuro Ikeda, Kawasaki (JP); Eiji Kitagawa, Kawasaki (JP); Hiroshi Yamada, Kobe (JP)

(73) Assignee: Fujitsu Limited, Kawasaki (JP)

( * ) Notice: Subject to any disclaimer, the term of this patent is extended or adjusted under 35 U.S.C. 154(b) by 330 days.

(21) Appl. No.: 13/367,837

(22) Filed: Feb. 7, 2012

(65) Prior Publication Data

US 2012/0203528 A1     Aug. 9, 2012

Related U.S. Application Data

(63) Continuation of application No. PCT/JP2009/064313, filed on Aug. 13, 2009.

(51) Int. Cl.
*G06F 17/50* (2006.01)
*G08G 1/01* (2006.01)

(52) U.S. Cl.
CPC ........ *G06F 17/5009* (2013.01); *G06F 17/5095* (2013.01); *G08G 1/0125* (2013.01); *G06F 17/5068* (2013.01)
USPC ........... 703/2; 703/6; 703/8; 703/13; 711/170

(58) Field of Classification Search
CPC .......................... G06F 17/5009; G06F 17/5068
USPC .................. 703/2, 6, 8, 13; 711/170
See application file for complete search history.

(56) References Cited

U.S. PATENT DOCUMENTS

| | | | |
|---|---|---|---|
| 2002/0073101 A1* | 6/2002 | Stoyen | 707/104.1 |
| 2008/0027692 A1* | 1/2008 | Fables et al. | 703/6 |
| 2011/0054874 A1* | 3/2011 | Ikeda et al. | 703/13 |
| 2011/0154287 A1* | 6/2011 | Mukkamala et al. | 717/105 |
| 2013/0145351 A1* | 6/2013 | Tunik et al. | 717/135 |

FOREIGN PATENT DOCUMENTS

| | | |
|---|---|---|
| JP | 5-324581 | 12/1993 |
| JP | 2000-3352 | 1/2000 |
| JP | 2004-54642 | 2/2004 |
| JP | 2007-47972 | 2/2007 |
| JP | 2007-265097 | 10/2007 |

OTHER PUBLICATIONS

International Search Report for PCT/JP2009/064313/, mailed Nov. 17, 2009.

* cited by examiner

*Primary Examiner* — Thai Phan
(74) *Attorney, Agent, or Firm* — Staas & Halsey LLP

(57) ABSTRACT

A simulator used in a distributed process simulation includes: a storage unit configured to store map information, agent information, and area allocation information; a simulation execution unit; a condition determination unit configured to determine the condition of the reference agent to be referenced by the simulation execution unit based on a movement state of the agent; an allocation discrimination unit configured to discriminate another computer allocated an area in which the reference agent corresponding to the condition can be located; and an agent information acquisition unit configured to acquire the information about the agent satisfying the condition of the reference agent from the other discriminated computer.

14 Claims, 31 Drawing Sheets

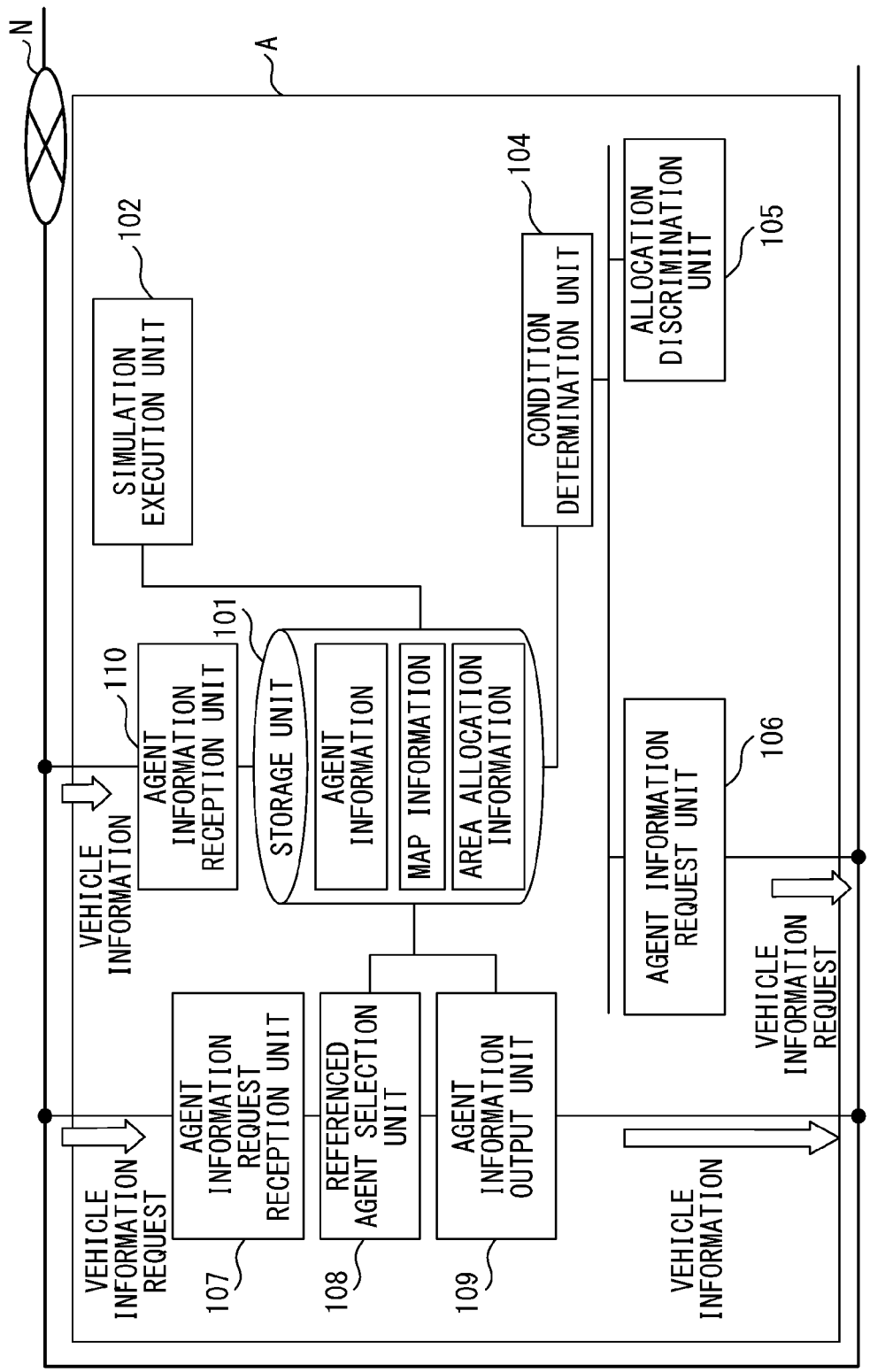
F I G. 2

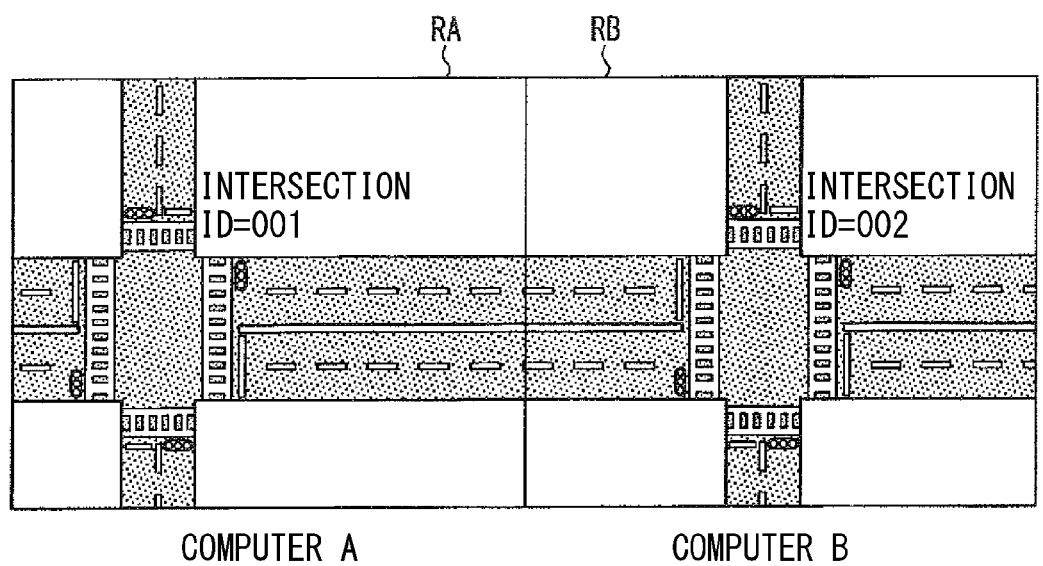
F I G. 3

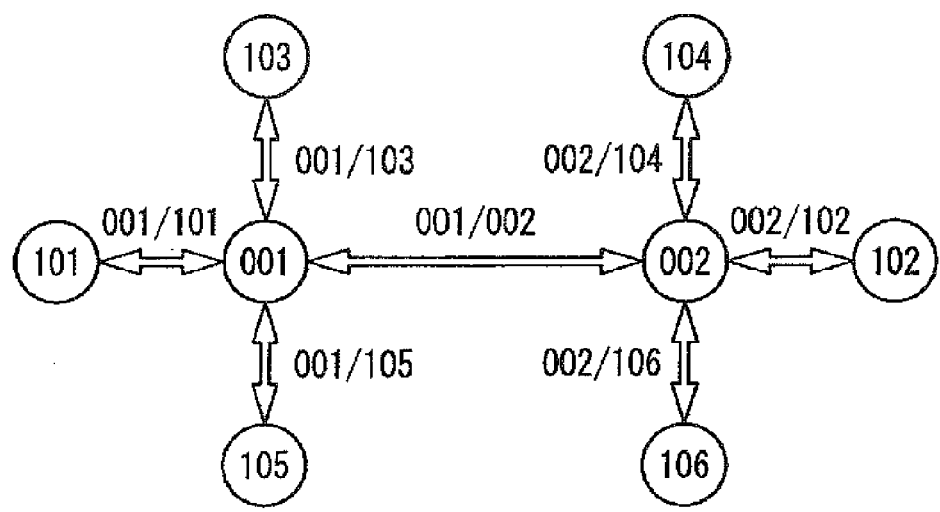
F I G. 4

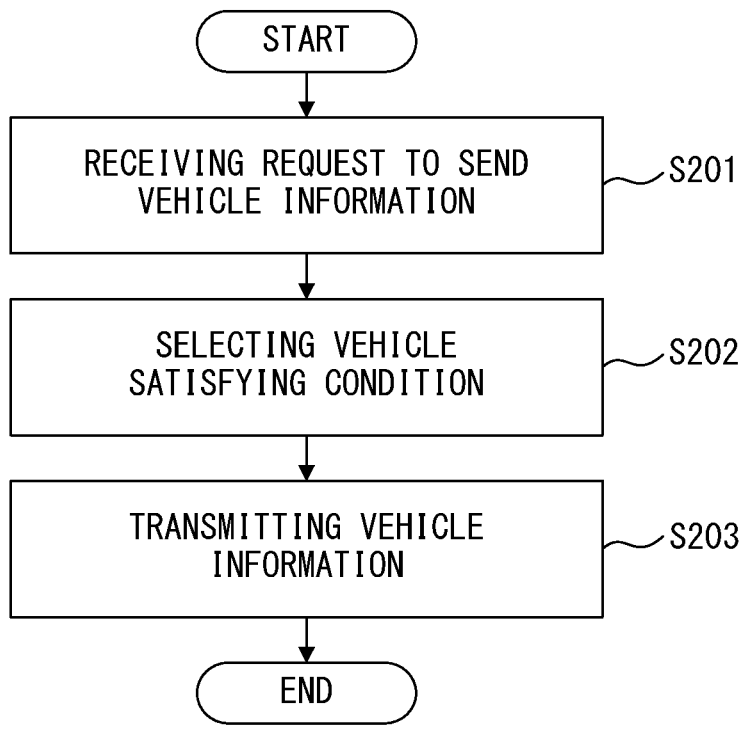
F I G. 7

(a)

| ROAD | 001/002 |
|---|---|
| DIRECTION | 001⇒002 |
| LANE | 1 |
| STARTING POSITION | 10m |
| ENDING POSITION | 60m |

F I G. 8 A

| ROAD | 001/002 | 002/102 |
|---|---|---|
| DIRECTION | 001⇒002 | 002⇒102 |
| LANE | 1 | 1 |
| STARTING POSITION | 10m | (START-EDGE) |
| ENDING POSITION | (END-EDGE) | 20m |

F I G. 8 B

| ROAD | 001/002 | 002/102 |
|---|---|---|
| DIRECTION | 001⇒002 | 002⇒102 |
| LANE | 1 | 1 |
| STARTING POSITION | 10m | (START-EDGE) |
| ENDING POSITION | (END-EDGE) | 50m |

F I G.  8 D

| ROAD | 001/002 |
|---|---|
| DIRECTION | 001⇒002 |
| LANE | 1 |
| NUMBER OF VEHICLES | MAXIMUM OF 2 |

FIG. 13A

| ROAD | 001/002 | 002/102 |
|---|---|---|
| DIRECTION | 001⇒002 | 002⇒102 |
| LANE | 1 | 1 |
| NUMBER OF VEHICLES | MAXIMUM OF 2 ||

FIG. 13B

| ROAD | 001/002 | 002/102 |
|---|---|---|
| DIRECTION | 001⇒002 | 002⇒102 |
| LANE | 1 | 1 |
| NUMBER OF VEHICLES | MAXIMUM OF 2 | |

F I G. 1 5 A

| ROAD | 001/002 | 002/102 | 002/102 |
|---|---|---|---|
| DIRECTION | 001⇒002 | 102⇒002 | 102⇒002 |
| LANE | 1 | 1 | 2 |
| NUMBER OF VEHICLES | MAXIMUM OF 2 | MAXIMUM OF 2 | MAXIMUM OF 2 |
| DISTANCE | – | 200m | 200m |

F I G. 1 5 B

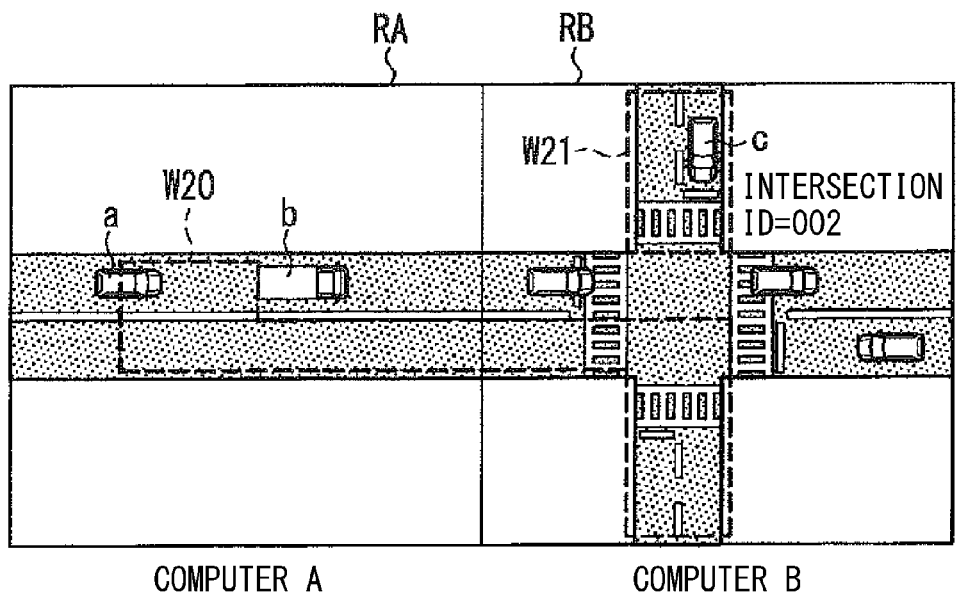
F I G. 1 8 B

DISTRIBUTED PROCESS SIMULATOR

CROSS REFERENCE TO RELATED APPLICATION

This application is a continuation of PCT application PCT/JP2009/064313, which was filed on Aug. 13, 2009.

FIELD

The present invention relates to a distributed process simulator for realizing a simulation by distributed processing using a plurality of computers.

BACKGROUND

A simulator has conventionally been devised for simulating the behavior of each agent in a virtual environment. As an agent can be, for example, a mobile object such as a vehicle, a motorbike, a bicycle, a walker, etc. The technology of predicting the traffic density, the occurrence state of congestion, etc. using, for example, a simulator for simulating the behavior of a vehicle has been well known. Such a traffic simulator can evaluate in advance the effect of a smooth traffic flow by a traffic policy for the construction of infrastructural facilities or the like. Therefore, it is used as an effective tool when city planning is coordinated. In addition, there is a traffic simulator capable of predicting the state of occurring a traffic accident by simulating a recognition mistake and a determination mistake of a driver (for example, refer to Patent Document 1).

A simulator can be roughly classified into two types. That is, there are a macro traffic simulator for simulating a traffic flow as a fluid and a micro traffic simulator for simulating the behavior of each agent. Generally, the micro traffic simulator can analyze the process of the occurrence of a traffic phenomenon in more detail than the macro traffic simulator. However, since it requires tremendously high computational complexity, it can be applied only to a simulation of a traffic flow in a relatively narrow range.

On the other hand, there is the well known technology for distributed processing for processing a large-scale process which cannot be performed by one computer by processing it with a plurality of computers connected and cooperating over a network. For example, a system of processing computer resources on a global network such as the Internet etc. as a virtual computer is called grid computing, and provides various types of middleware.

DOCUMENT OF PRIOR ART

Patent Document 1: Japanese Laid-open Patent Publication No. 2007-47972

SUMMARY

By using the above-mentioned technology for distributed processing, an increasing number of agents processed by one computer can be suppressed, and the computational complexity for simulating the behavior of the agents can be reduced. However, with an increasing number of agents processed in the entire system, there occurs high traffic among the computers, thereby degrading the performance. Therefore, the present invention is directed to reducing the traffic among the computers in simulating distributed processing.

The simulator disclosed by the present application realizes the simulation of the behavior of a plurality of agents located in a virtual space by distributed processing using a plurality of computers. The simulator of each of the computers is accessible to a storage unit storing the map information about the target area allocated to the computer itself in the virtual space, the agent information including the information relating to at least the position of an agent, and the area allocation information indicating the area allocated to other computers. The simulator includes: a simulation execution unit configured to simulate the behavior of each agent in the target area by referring to the agent information about other agents, and to repeatedly perform the process of updating the agent information about each agent; a condition determination unit configured to determine a condition of a reference agent for reference in a process of simulating the behavior of each agent by the simulation execution unit based on the movement state of the agent in the target area obtained from the information about the position of the agent; an allocation discrimination unit configured to discriminate another computer to which an area where the reference agent corresponding to the condition can be located using the area allocation information; and an agent information acquisition unit configured to acquire the agent information about the reference agent satisfying the condition of the reference agent from the other computer discriminated by the allocation discrimination unit and to store the acquired information in the storage unit.

According to the disclosure of the specification of the present application, the traffic can be reduced among the computers in the simulation of distributed processing.

BRIEF DESCRIPTION OF DRAWINGS

FIG. 2 is an example of a configuration of the computer according to the first embodiment;

FIG. 3 is an example of the state in which the space to be simulated is allocated in the first embodiment;

FIG. 4 is an example of a road map according to the first embodiment;

FIG. 7 is an operation chart indicating an example of the process on the agent information transmission side according to the first embodiment;

FIGS. 8A through 8D are data examples of the conditions of the vehicle referenced in the first embodiment;

FIGS. 13A through 13B are data examples of the conditions of the vehicle referenced in the second embodiment;

FIGS. 15A through 15B are data examples of the conditions of the vehicle referenced in the third embodiment;

FIGS. 18A through 18C are examples of the traffic state according to the fifth embodiment.

DESCRIPTION OF EMBODIMENTS

The embodiments according to the present invention are concretely described below with reference to the drawings.

First Embodiment

Figure 1:
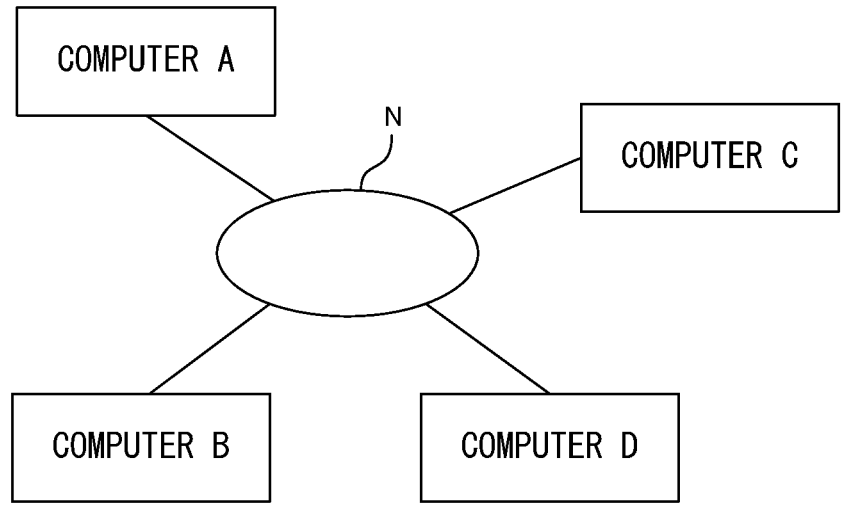
FIG. 1 is an example of a configuration of the simulation system in the first embodiment.

FIG. 1 is an example of a configuration of the simulation system for distributed processing including a computer in the first embodiment. In the example illustrated in FIG. 1, a plurality of computers A through D are connected over a network N. The computers A through D realize by distributed process the simulation of the behavior of a plurality of agents in a virtual space. Each of the computers A through D is independent hardware provided with at least a processor and a memory. A plurality of computers for realizing the distributed processing is not necessarily independent hardware. For example, in a multi-processor computer provided with a plurality of CPUs, each CPU can function as a plurality of computers to realize the distributed processing. That is, each computer is to communicate data with each other, can be a resource for execution of data processing, and is not limited to a specific embodiment. In addition, the number of computers is not limited to an example illustrated in FIG. 1.

Each of the computers A through D is allocated a target area in the virtual space. Each of the computers A through D is a simulator for simulating the behavior of an agent in the allocated target area. The simulator of each of the computers A through D is accessible to a storage unit storing the map information about the target area allocated to the computer itself in the virtual space, the agent information including the information relating to at least the position of an agent, and the area allocation information indicating the area allocated to other computers. The simulator includes: a simulation execution unit configured to simulate the behavior of an agent in a target area using the agent information; a condition determination unit configured to determine the condition of the reference agent information to be referenced by the simulation execution unit; an allocation discrimination unit configured to discriminate which computer has the agent information about the reference agent corresponding to the condition; and an agent information acquisition unit configured to acquire the agent information from the discriminated computer.

Practically, the simulation execution unit simulates the behavior of each agent in a target area with reference to the agent information about another agent, and repeatedly performs the process of updating the agent information about each agent. The condition determination unit determines the condition of the reference agent to be referenced in the process of simulating the behavior of each agent by the simulation execution unit based on the movement state of the agent in the target area acquired from the information about the position of the agent. The allocation discrimination unit discriminates according to the area allocation information another computer allocated an area in which the reference agent corresponding to the condition can be located. The agent information acquisition unit acquires the agent information about the reference agent satisfying the condition of the reference agent from the other computer discriminated by the allocation discrimination unit, and stores the information in the storage unit. Thus, the simulation execution unit can refer to the agent information acquired from the other computer. With the configuration, the condition determination unit determines the condition of the agent information to be acquired from the other computer, and the allocation discrimination unit designates the computer from which the agent information is to be acquired. Therefore, the agent information required by the simulation execution unit can be efficiently acquired. For example, the data communicated by the computer can be narrowed down to necessary data, thereby saving the amount of communication data among the computers and the computational complexity of each computer.

FIG. 2 is a block diagram of the functions indicating an example of a practical configuration of the computer A illustrated in FIG. 1. Other computers B through D can also be configured like the computer A. In the example in FIG. 2, the computer A includes a storage unit 101, a simulation execution unit 102, a condition determination unit 104, an allocation discrimination unit 105, an agent information request unit 106, an agent information request reception unit 107, a referenced agent selection unit 108, an agent information output unit 109, and an agent information reception unit 110.

The storage unit 101 stores map information about a target area allocated to the computer A in the virtual space to be analyzed, agent information including the information about at least the position of an agent, and area allocation information indicating the area allocated to other computers.

The simulation execution unit 102 simulates the behavior of each agent in the target area of the computer A by referring to the agent information in the storage unit 101, and repeatedly performs the process of updating the agent information about each agent. The condition determination unit 104 determines the condition of the reference agent to be referenced in the process of simulating the behavior of each agent by the simulation execution unit 102 based on the movement state of the agent in the target area obtained from the information about the position of the agent of the agent information. The allocation discrimination unit 105 discriminates according to the area allocation information in the storage unit 101 other computers allocated the area in which the reference agent corresponding to the condition determined by the condition determination unit 104 can be located.

The agent information request unit 106 outputs the condition of the reference agent to other computers discriminated by the allocation discrimination unit 105. The agent information reception unit 110 receives the agent information from the other computers to which the agent information request unit 106 output the condition, and stores the information. The agent information request unit 106 and the agent information reception unit 110 are practical examples of the agent information acquisition units.

The agent information request reception unit 107 accepts from another computer the condition of the agent to be referenced by the simulation execution unit of the other computer. The referenced agent selection unit 108 selects from the storage unit 101 the agent information satisfying the condition accepted by the agent information request reception unit 107. The agent information output unit 109 transmits the agent information selected by the referenced agent selection unit to the other computer.

With the configuration illustrated in FIG. 1, the condition determination unit 104 determines based on the movement state of an agent located in the target area of the computer A the condition of another agent to be reference by the agent. The allocation discrimination unit 105 discriminates the other computer allocated the area in which the agent satisfying the condition can be located, and the agent information request unit 106 outputs the condition to the other computer and requests the information about the agent satisfying the condition. The agent information reception unit 110 receives the information about the agent satisfying the condition from the other computer, and stores the information in the storage unit 101. The simulation execution unit 102 can refer to the agent information stored in the storage unit 101 and simulate the behavior of the agent in the target area. Thus, the communication of unnecessary information can be suppressed by transmitting and receiving only the information about the agent corresponding to the condition among the computers, thereby reducing the traffic.

The simulation system for distributed processing with the configuration illustrated in FIGS. 1 and 2 can be applied to, for example, a traffic simulation. In this case, the agent is a mobile object such as a vehicle, a walker, etc., and the condition determination unit 104 can determine the condition of the reference agent based on at least one of the position coordinates, the speed, the road on which a vehicle is driven, the lane on which a vehicle is driven, the route, and the driving behavior of a driver as the movement state of the agent. Thus, a traffic simulation in which the traffic among the computers A through D in the distributed processing is reduced can be realized. For example, applying the distributed processing technique, a wide range simulation of a traffic flow can be realized by the micro traffic simulator.

Thus, according to the present embodiment, the virtual space to be simulated is divided, a plurality of computers are allocated the respective divided spaces, and each computer simulates the behavior of the agent located in the allocated virtual space. Since the agent moves among the virtual spaces, when an agent moves from a space (target area) allocated to a computer to a space (target area) allocated to another computer, a plurality of computers communicate with one another for the information about the agent (communication occurrence case 1). The behavior of the agent is determined depending on the surrounding situation. Therefore, to simulate the behavior of the agent, the simulation execution unit of each computer communicates with another computer allocated an area adjacent to the target area in the virtual space allocated to the unit itself, and transmits and receives the information about the surrounding situation, for example, the position of another agent, speed, etc. (communication occurrence case 2). The communication occurrence case 1 occurs when a vehicle moves over the divided spaces while the communication occurrence case 2 occurs at the intervals (for example, several milliseconds through several hundreds of milliseconds) of the update of the behavior of the vehicle. In the present embodiment, the traffic of the communication occurrence case 2 is reduced as described above.

That is, each of the computers A through D transmits and receives only the information about a necessary agent by considering the reference range of each agent, thereby reducing the traffic in the communication occurrence case 2. The behavior of the agent simulated by each computers A through D has an influence of surrounding agents. Therefore, the simulation execution unit 102 of each of the computers A through D refers to the information about the surrounding agents each time it performs the process of simulating the behavior of the agent to be analyzed. The reference range is different depending on the movement state of the agent to be analyzed. For example, between the state in which an agent to be analyzed is driven at a high speed and the state in which it is stopped according to the traffic signal, the ranges in which the other agents referenced by the agent to be analyzed are located are different. Therefore, for example, with the more movements over the virtual spaces by the high-speed running of a large number of agents, it is more necessary to communicate data to be processed, thereby increasing the traffic between the computers. The present embodiment determines the condition of another agent to be referenced based on the movement state of each agent, and transmits and receives only the information about the agent corresponding to the condition, thereby reducing the traffic between the computers.

Each of the computers A through D can be realized by, for example, installing a specified program on a general-purpose computer such as a personal computer, a server machine, etc. Not only a general-purpose computer but also a computer incorporated into electronic equipment such as an onboard information terminal, mobile telephone, a PDA (personal digital assistant), a home electric appliances, etc. can form the computers A through D.

In each of the computers A through D, each function of the simulation execution unit 102, the condition determination unit 104, the allocation discrimination unit 105, the agent information request unit 106, the agent information request reception unit 107, the referenced agent selection unit 108, the agent information output unit 109, and the agent information reception unit 110 is realized by the processor of the CPU etc. executing a specified program. Therefore, a program for realizing each of the above-mentioned functions with a computer or a record medium recording the program is also an aspect of the present invention. In addition, the storage unit 101 is embodied by a storage device built in a computer or a computer-accessible storage device.

Next, an example of an operation of each computer A in a distributed process simulation system is explained with reference to a practical example. As an example, the case in which the distributed process simulation system functions as a micro simulator for reproducing the traffic flow by simulating the behavior of each vehicle moving in a virtual space is described below.

Described below is an example of the operation of the computers A and the computer B. FIG. 3 is an example of the state of allocating a space to be simulated (virtual space) in the present operation example. In the example in FIG. 3, the target area RA as a part of virtual space is allocated to the computer A, and the target area RB is allocated to the computer B. The computers A and B respectively perform the simulation processes on the agents located in the target areas RA and RB. The computers A and B hold in the storage unit 101 the information about to which computer the divided virtual space (target area) is allocated as the area allocation information. The area allocation information is the data for association between the target area and the computer.

Each of the computers A and B stores, for example, the map information as illustrated in FIG. 4 in the storage unit 101. In the example in FIG. 4, the map information is expressed by a directed graph including a node and a link. An assigned label illustrated in FIG. 4 is the ID of a node and a link. Each node corresponds to the intersection having the same ID. For example, a node 001, a node 002, and a link 001/002 in FIG. 4 respectively correspond to an intersection 001, an intersection 002, and a road connecting the intersections 001 and 002 in FIG. 3. A node can be assigned the information such as a coordinate of the intersection. A link can be assigned the information such as the number of lanes of a road.

Figure 5A:
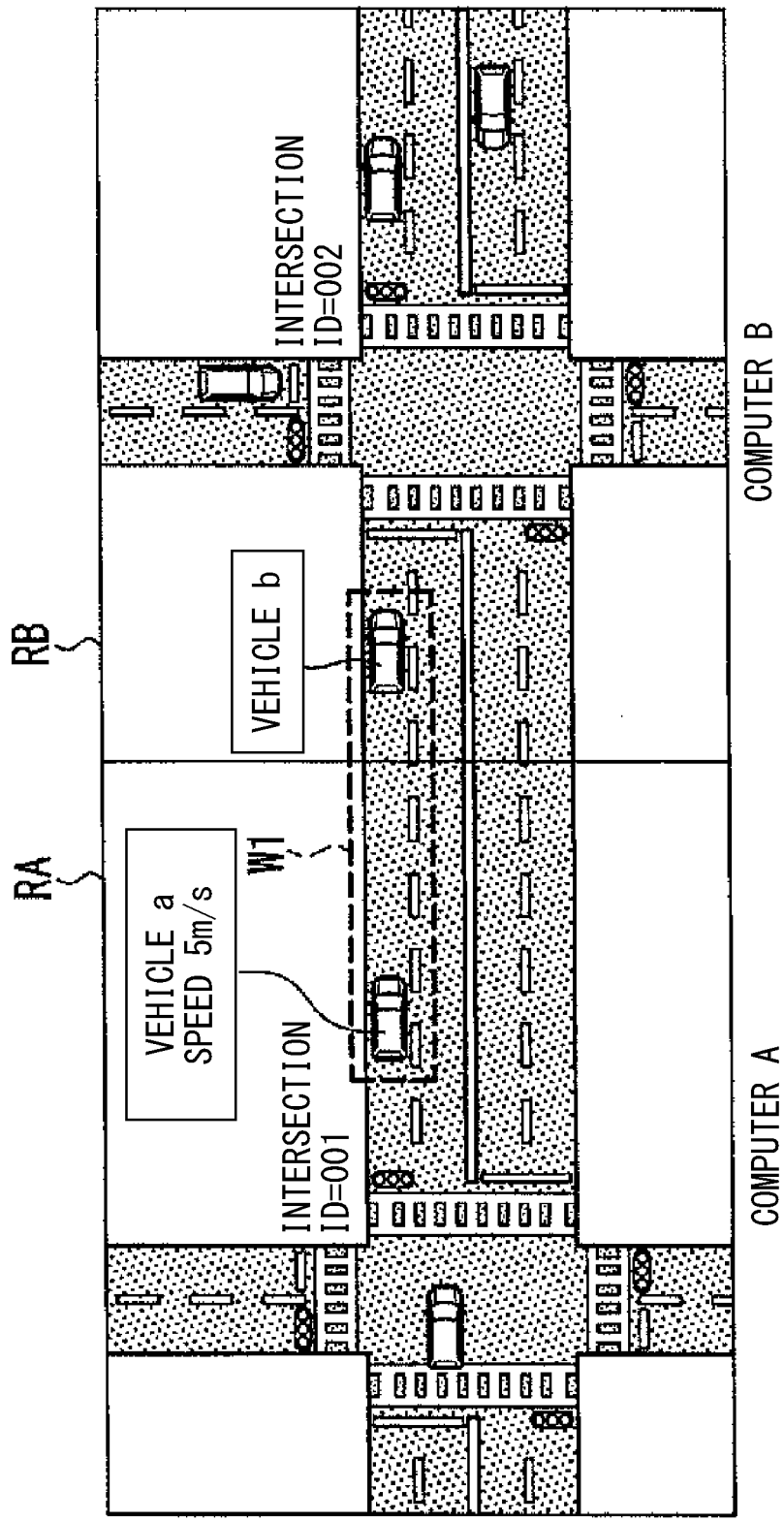
FIGS. 5A and 5B are examples of the traffic state according to the first embodiment.
Figure 5B:
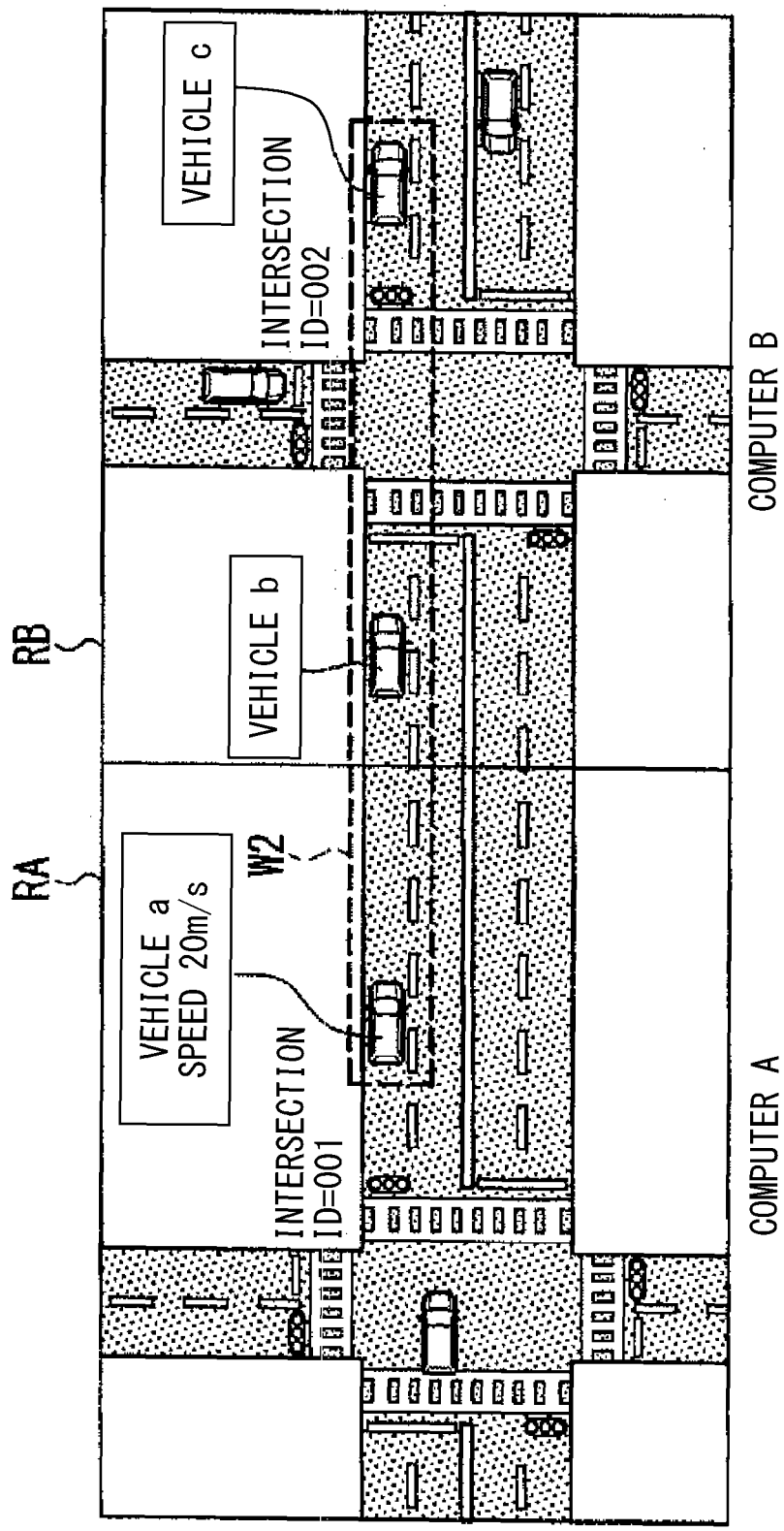

In the present embodiment, the two traffic situations illustrated in FIGS. 5A and 5B is to be considered. In the example of the traffic situation, agents are all vehicles. In the example of the traffic situation illustrated in FIG. 5A, in the target area RA of the computer A, the vehicle a is running from the intersection ID=001 to the intersection ID=002 at the speed of 5 m/s. In the example of the traffic situation illustrated in FIG. 5B, in the target area RA, the vehicle a is running from the intersection ID=001 to the intersection ID=002 at the speed of 20 m/s. The movement state of the vehicle a in the area RA can be stored as agent information in the storage unit 101 of the computer A. The agent information stored in the storage unit 101 of the computer A is stored not only about the vehicle a but also about all vehicles located in the target area RA.

Figure 6:
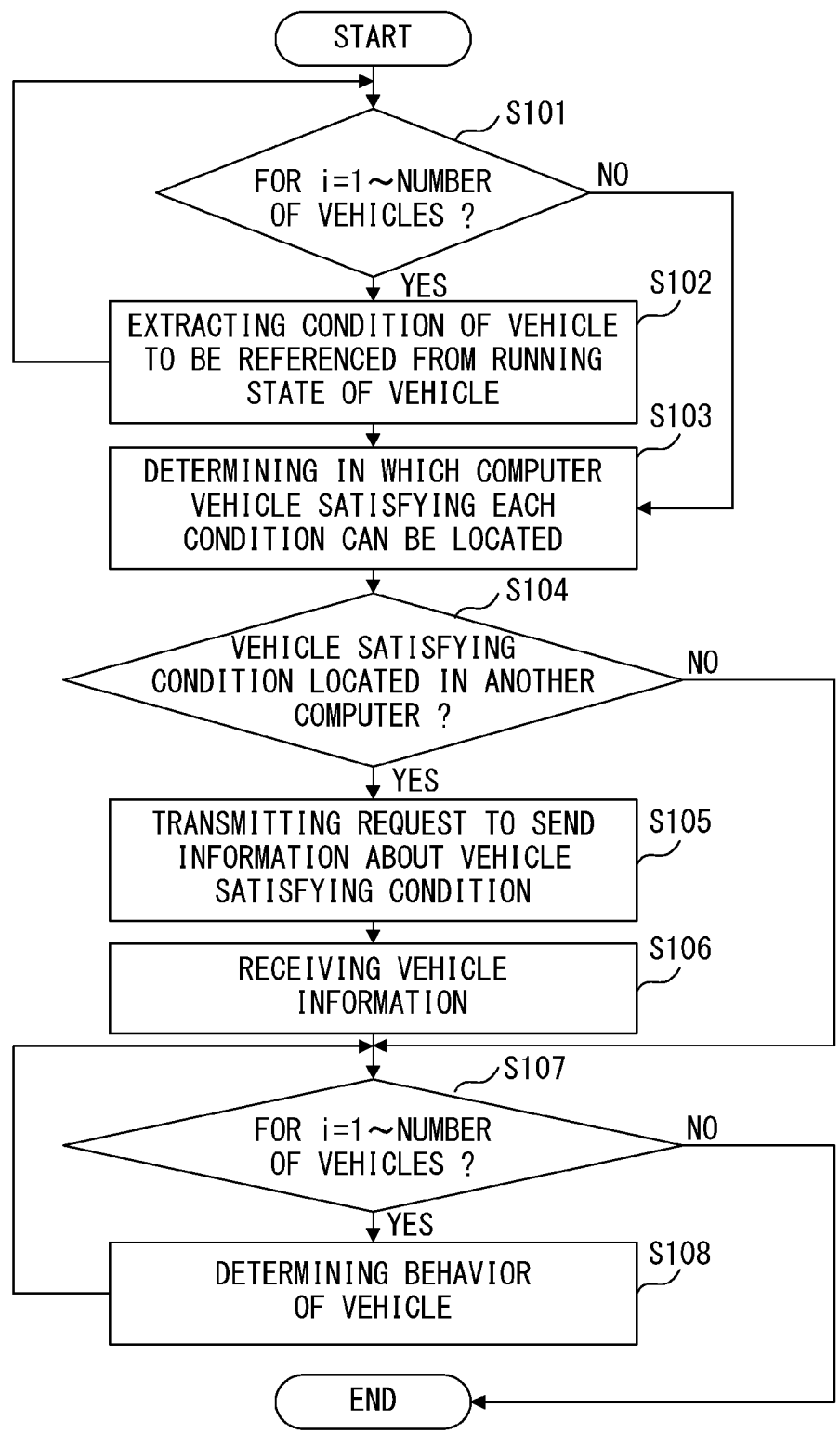
FIG. 6 is an operation chart indicating an example of the process on the agent information reception side according to the first embodiment.

In this example, it is explained the information about the agent to be referenced when the computer A simulates the behavior of the vehicle a is requested for the computer B, and the operation being performed when the agent information is passed from the computer B to the computer A. FIG. 6 is an operation chart of an example of the calculating process on the receiving side (computer A in the present example) of the agent information. FIG. 7 is an operation chart of an example of the process of the transmitting side (computer B in the present example) of the agent information. The similar process can be performed on the communication in the reverse direction.

As illustrated in FIG. 6, first in the computer A, the condition determination unit 104 determines the vehicle condition to be referenced from the movement state of each vehicle on all vehicles (until NO in operation S101) located in the space (target area RA) allocated to the computer A (operation S102). The movement state of each vehicle can be acquired from the agent information in the storage unit 101, for example. The condition determination unit 104 can be set the condition so that, for example, the higher the speed of a vehicle is, the broader range can be referenced in the simulation. For example, the frames W1 and W2 in FIGS. 5A and 5B indicate the examples of the reference range in the process of simulating the vehicle a. The higher the speed of a vehicle is, the broader range of the vehicle may be referenced in determining the behavior, thereby realizing a more realistic simulation. The condition determination unit 104 determines the condition to refer to the vehicle in the range within 50 m preceding the vehicle a in the example illustrated in FIG. 5A, and the vehicle in the range within 200 m preceding the vehicle a in the example illustrated in FIG. 5B. Since the computer A holds the position of the vehicle a and the map information about the target area RA, the vehicle condition to be referenced can be expressed as associated with the map information. In this example, it is assumed that the vehicle a is running at the position of 10 m from the intersection 001 on the first lane of the road from the intersection 001 to the intersection 002

FIGS. 8A and 8B are examples of the data indicating the vehicle condition referenced by the vehicle a in the traffic situation illustrated in FIGS. 5A and 5B respectively. In the present example, the condition of the referenced vehicle is expressed by the road, the lane, the direction, and the range (starting position and stop position) on which the vehicle is driven. The condition illustrated in FIG. 8A indicates that the vehicle to be referenced is located on the lane 1 of the road from the intersection 001 to the intersection 002 and in the range of 10 m through 60 m from the intersection 001. On the other hand, the condition illustrated in FIG. 8B indicates that the vehicle to be referenced is located on either the range from the position of 10 m from the intersection 001 as the starting point to the end-edge (intersection 002) as the ending position on the lane 1 of the road from the intersection 001 to the intersection 002 or the range from the start-edge (intersection 002) as the starting position to the position of 20 m from the start-edge as the ending position on the lane 1 of the road from the intersection 002 to the intersection 102.

Next, in the computer A, the allocation discrimination unit 105 determines in which computer the vehicle satisfying the condition determined by the condition determination unit 104 is located (operation S103). As described above, each computer holds as area allocation information the information to which computer the divided space is allocated. The allocation discrimination unit 105 can determine to which computer the space in which the vehicle satisfying the condition may be present is allocated from the coordinates of the intersection and the road included in the condition by referring to the area allocation information.

When the vehicle satisfying the condition can be located in another computer (operation S104), the agent information request unit 106 transmits to another corresponding computer a request to send the vehicle information satisfying the condition (operation S105). In this case, a request to transmit the vehicle information satisfying the condition illustrated in FIG. 8A or 8B is issued to the computer B.

In the target area of the computer A, there can be a vehicle other than the vehicle a. When a plurality of vehicles are located in the target area, the vehicle condition to be referenced is extracted for each vehicle (operations S101 and S102). Thus, when a plurality of conditions are extracted for the plurality of vehicles, the condition determination unit 104 can calculate a logical sum of the plurality of conditions. The logical sum of the plurality of conditions satisfies at least one of the plurality of conditions. Based on the logical sum, another computer is determined, and the vehicle information is requested to the determined computer, thereby reducing the traffic as compared with the case in which the vehicle information is requested to the other computer for each condition before merging.

Described below is a practical example of merging calculation on the plurality of conditions. For example, described below is the case in which there is another vehicle x 20 m preceding the vehicle a illustrated in FIG. 5A, and the vehicle condition to be referenced when the behavior of the vehicle x is simulated is the condition illustrated in FIG. 8C.

Figure 8C:

When a logical sum of the condition (a) of the vehicle a illustrated in FIG. 8A and the condition (x) illustrated in FIG. 8C is obtained, the condition determination unit 104 compares the road, the direction, and the lane between the conditions (a) and (x). When the roads, the directions, and the lanes are the same, the condition determination unit 104 compares the starting positions and the ending positions. The starting position having a smaller value (10 m in this case) and the ending position having a larger value (end terminal) are used as the starting position and ending position of the logical sum. In this example, for the road (lane 1) from the intersection 001 to the intersection 002, the range from the position of 10 m from the intersection 001 (start-edge) to the end-edge (intersection 002) is the range of the logical sum. For the road (lane 1) from the intersection 002 to the intersection 102, the range from the intersection 002 (start-edge) to the position of 50 m is the condition of the logical sum. If one of the road, the direction, and the lane is different between the condition (a) and the condition (x), the simple sum of the condition (a) and the condition (x) can be used as a logical sum.

Thus, if there can be a vehicle referenced by the vehicle other than the vehicle a located in the space allocated to the computer A in the computer B, it is preferable from the viewpoint of traffic reduction that the logical sum of the condition is acquired in advance on the computer A side, and then a request to send the vehicle information is issued. That is, it is preferable that the condition determination unit 104 determines the condition of the reference agent to be referenced about a plurality of agents in the target area, and calculates the logical sum of the condition of the reference agent in a plurality of agents. In this case, the allocation discrimination unit 105 discriminates according to the area allocation information another computer in which an area in which a reference agent corresponding to the logical sum can be located is allocated. Thus, the merge of the condition of a plurality of agents can be transmitted as a request about the agent information to another computer. As a result, the traffic with another computer can be saved.

Described next is an example of the operation of the computer B which receives a request to send vehicle information. As illustrated in FIG. 7, in the computer B, the agent information request reception unit 107 receives a request to send the vehicle information from the computer A (operation S201), and the referenced agent selection unit 108 selects a vehicle satisfying the condition (operation S202). In the traffic situation illustrated in FIG. 5A, the vehicle satisfying the condition illustrated in FIG. 8A is the vehicle b. In the traffic situation illustrated in FIG. 5B, the vehicles satisfying the condition illustrated in FIG. 8B are the vehicle b and vehicle c. The referenced agent selection unit 108 compares the condition included in the request to send with the vehicle information recorded in the storage unit 101 of the computer B, thereby selecting the vehicle satisfying the condition. For example, when the condition is the data indicating the road, the lane, the direction, and the range as illustrated in FIGS. 8A and 8B, it can be determined whether or not each vehicle satisfies the condition by determining whether or not the position information and the direction of each vehicle indicated by the vehicle information recorded in the storage unit 101 fall within the range and the direction determined by the condition. In the computer B, the agent information output unit 109 transmits the information about the vehicle satisfying the condition to the computer A (operation S203).

As illustrated in FIG. 6, in the computer A, when the agent information reception unit 110 receives the vehicle information satisfying the condition from the computer B (operation S106), the simulation execution unit 102 determines the behavior of the vehicle by considering the vehicle information received from the computer B for all vehicles located in the space (target area) allocated to the unit itself (until the determination is NO in operation S107) (operation S108). That is, the simulation execution unit 102 of the computer A refers to the vehicle information originally recorded in the storage unit 101 and the vehicle information received from the computer B, and simulates the behavior of the vehicle in the target area.

As described above, according to the present embodiment, the vehicle to be referenced can be limited by considering the position and the speed of the vehicle, thereby suppressing the transmission and reception of unnecessary vehicle information.

Second Embodiment

Figure 9:
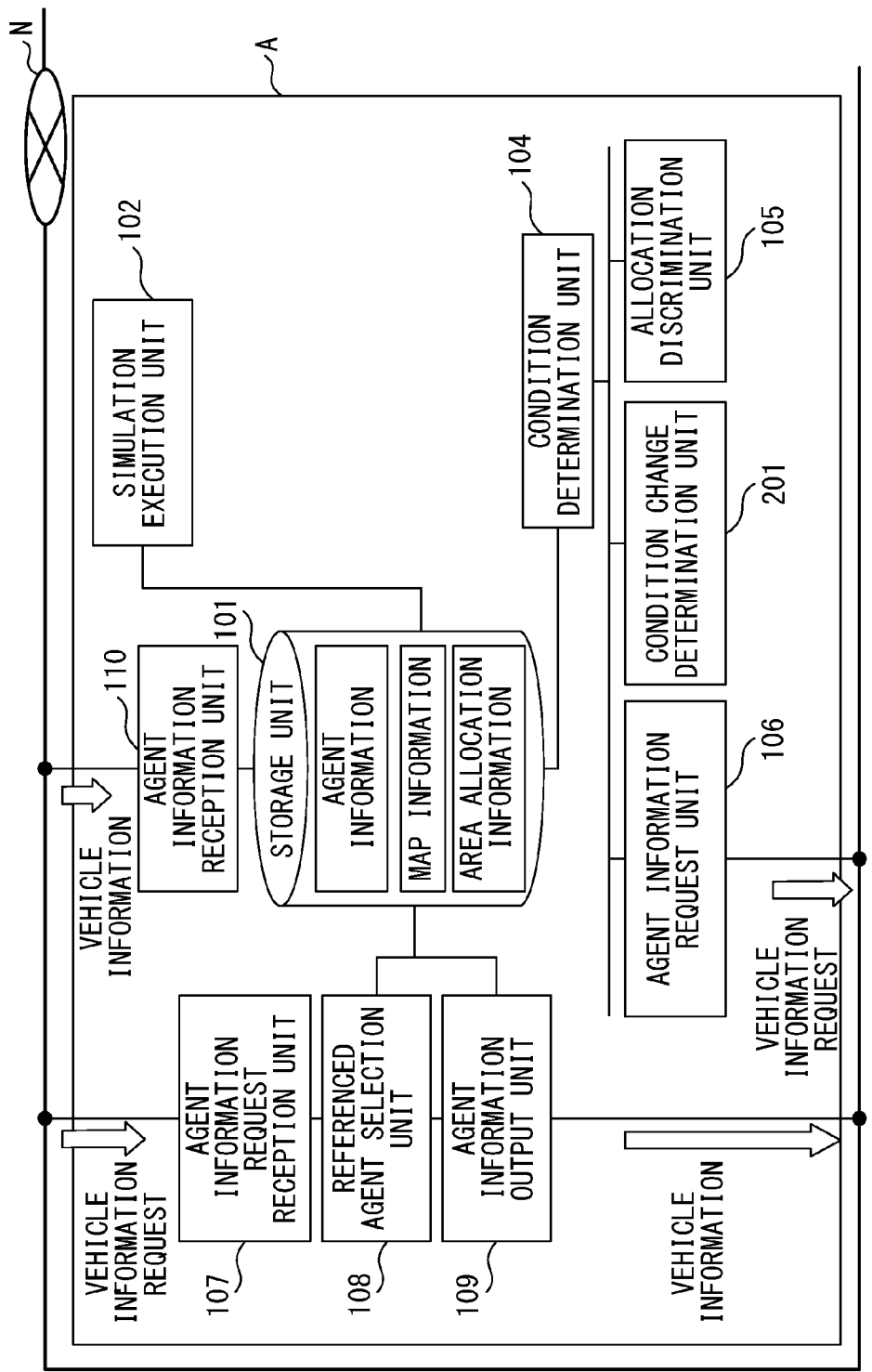
FIG. 9 is an example of a configuration of the computer according to the second embodiment.

FIG. 9 is a block diagram of the function indicating the configuration of the system of the computer according to the second embodiment. In the present embodiment, as in the first embodiment, an example of performing a distributed process using the computer A and the computer B is described. It is assumed that the state in which a space to be simulated is allocated is the same as the state in the first embodiment.

Figure 10A:
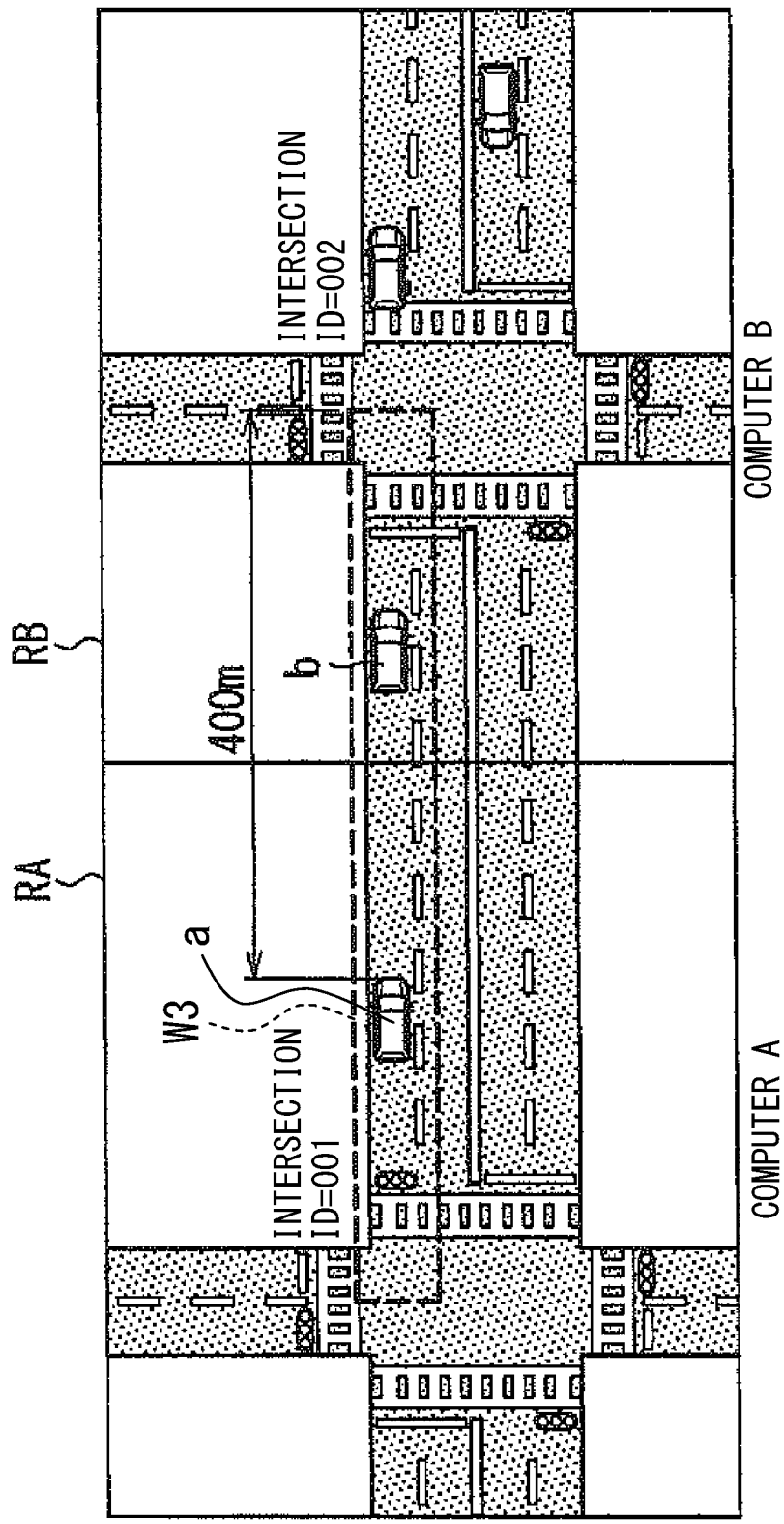
FIGS. 10A and 10B are examples of the traffic state according to the second embodiment.
Figure 10B:
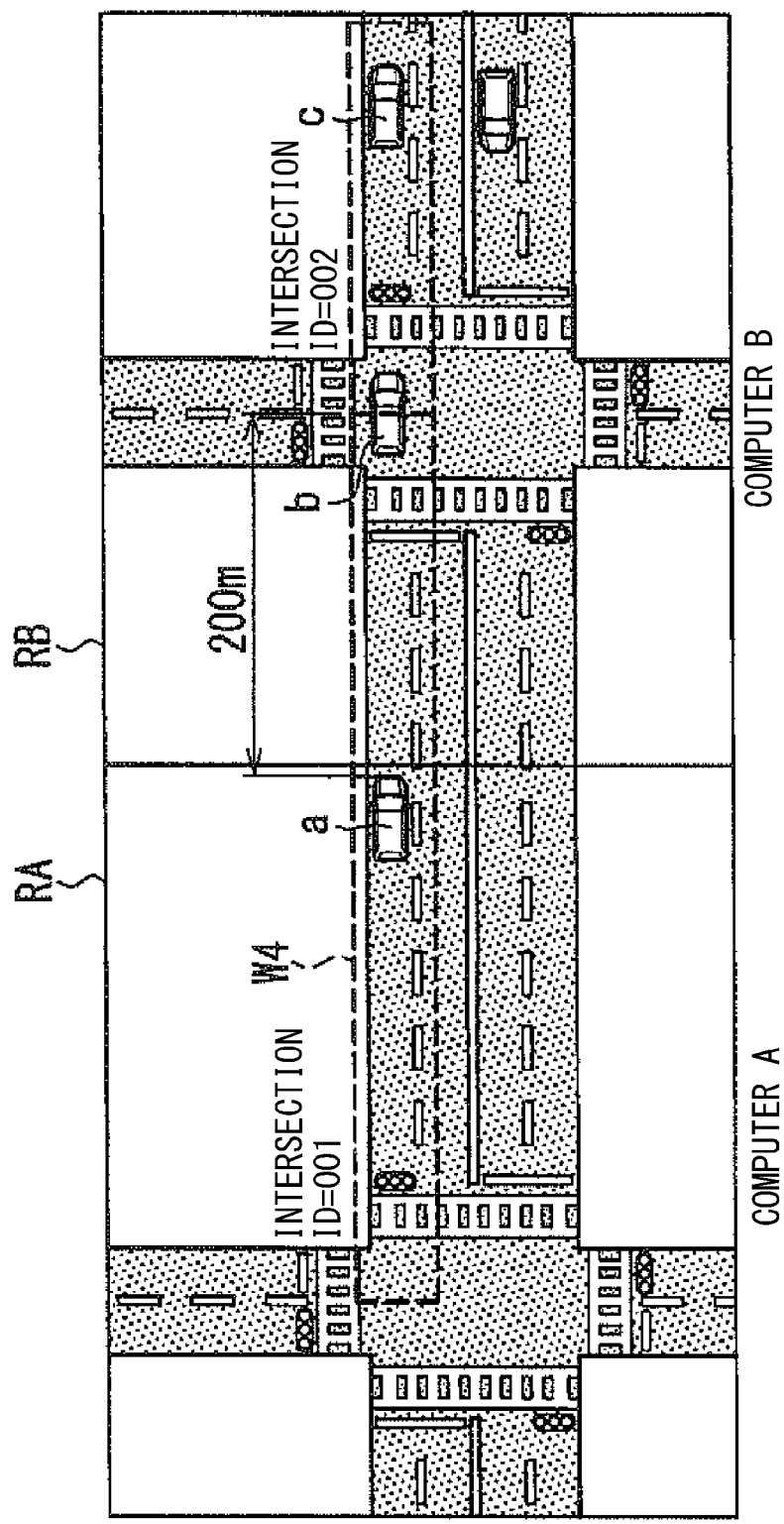

In the present embodiment, the two traffic states illustrated in FIGS. 10A and 10B are considered. In the examples of the traffic states, the agents are all vehicles. In the example of the traffic situation in FIG. 10A, the vehicle a is running at the position of 400 m from the intersection 002. On the other hand, in the example of the traffic situation in FIG. 10B, it is assumed that the vehicle a is running at the position of 200 m from the intersection 002.

Figure 11:
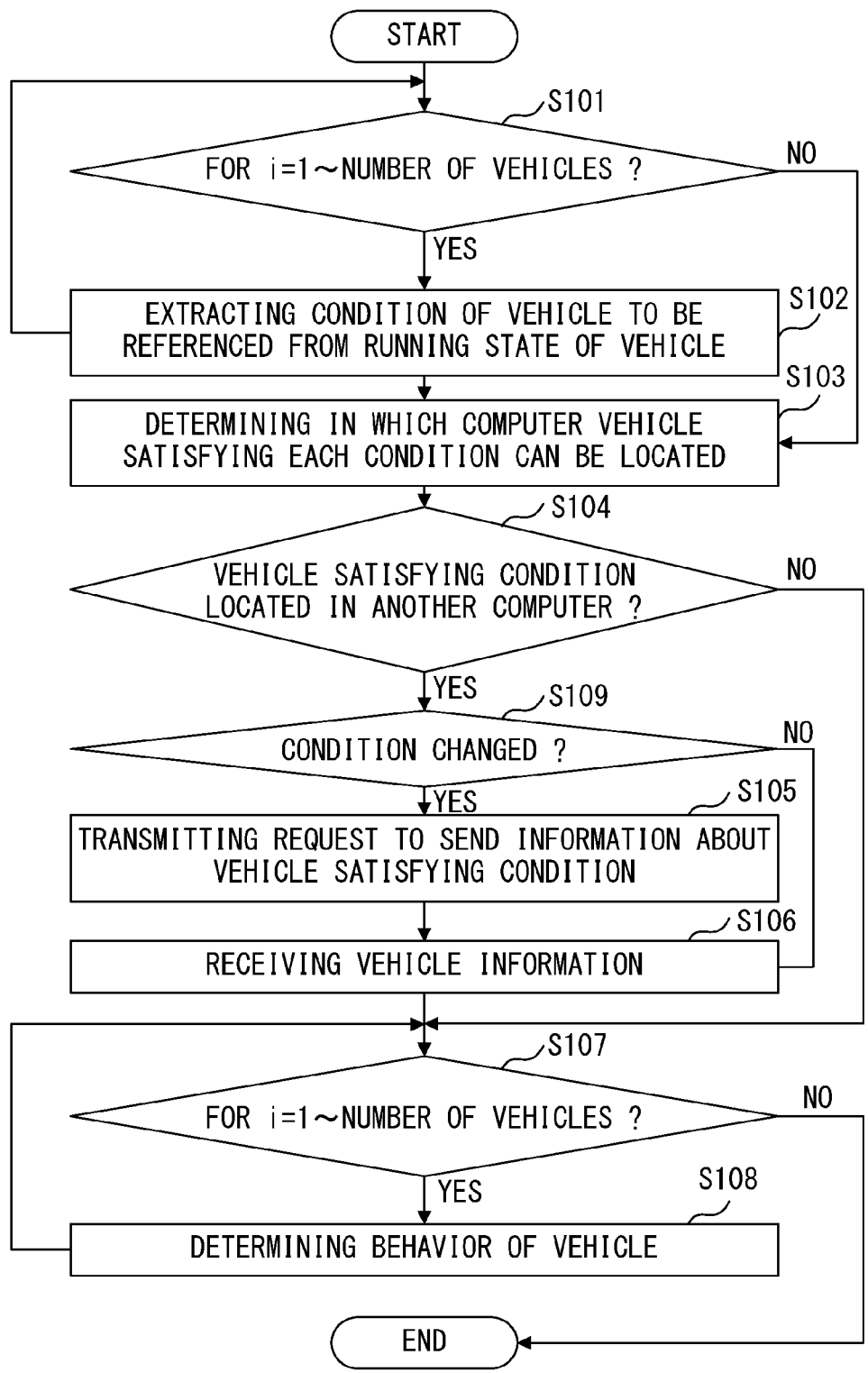
FIG. 11 is an operation chart indicating an example of the process on the agent information reception side according to the second embodiment.
Figure 12:
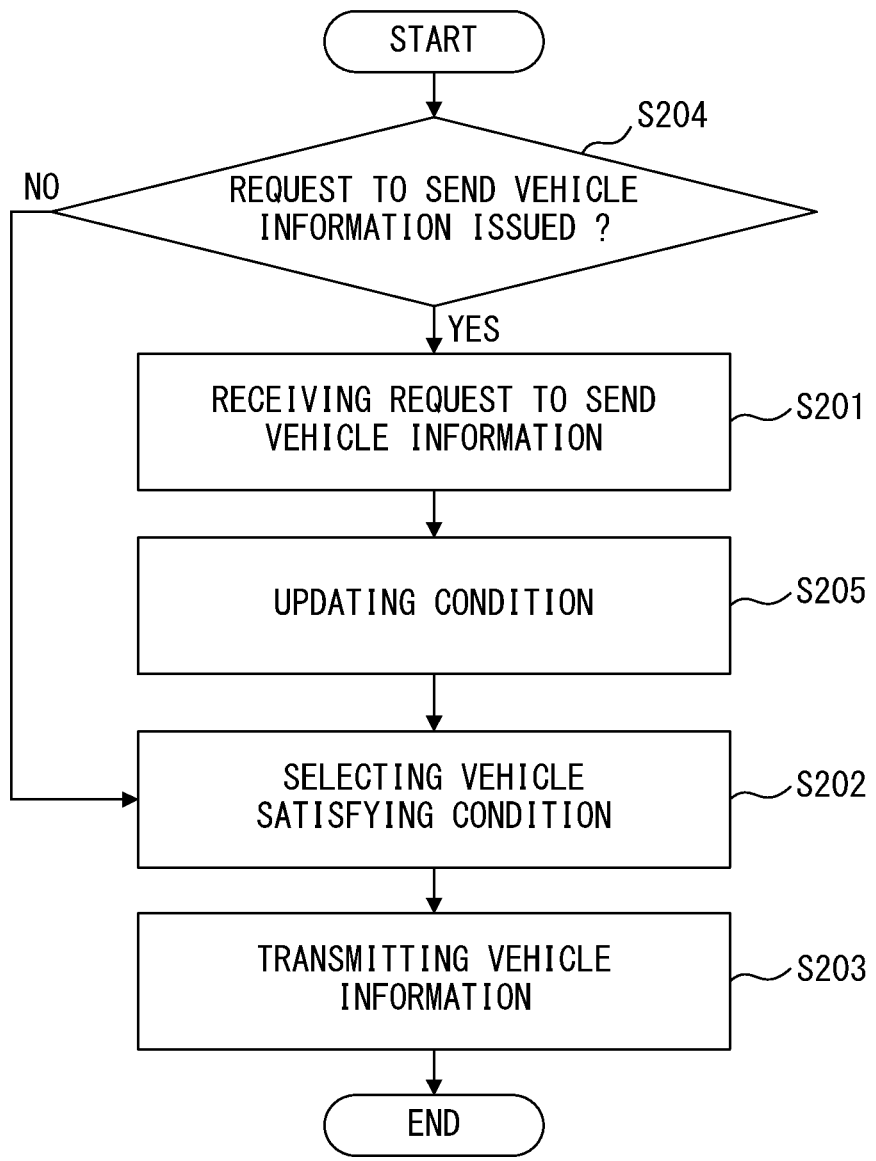
FIG. 12 is an operation chart indicating an example of the process on the agent information transmission side according to the second embodiment.

FIG. 11 is an operation chart of an example of the process on the side of receiving the agent information (the computer A in this example) in the distributed process simulator system according to the present embodiment. FIG. 12 is an operation chart of an example of the process of the calculation resources on the side of transmitting the agent information (the computer B in this example). In these operation charts, the same process as in the embodiment 1 is assigned the same reference numeral, and the description is omitted here. The communication in the reverse direction is similarly performed, but the description is also omitted here.

The condition determination unit 104 of the computer A determines the condition relating to the road and the lane depending on the state of approaching the forward intersection of a vehicle as the vehicle condition to be referenced (operation S102). For example, in the traffic situation in FIG. 10A, the vehicle a is a specified distance, for example, 300 m or more away from the forward intersection 002. Therefore, the condition determination unit 104 determines the vehicle b on the same road and lane as the vehicle a as the vehicle condition to be referenced. On the other hand, in the traffic situation illustrated in FIG. 10B, since the vehicle a is within 300 m from the forward intersection 002, the condition determination unit 104 determines not only the vehicle b on the same road and lane but also the vehicle c on the forward road and forward lane as the vehicle condition to be referenced. In this example, the state of approaching the intersection is based on the distance, but other reference such as the arrival time at the intersection etc. can be used. The frames W3 and W4 in FIGS. 10A and 10B indicate the ranges of the location of the vehicle referenced by the vehicle a. To the vehicle condition to be referenced, the condition relating to the number of vehicles referenced by the vehicle can also be added. FIGS. 13A and 13B are examples of the data of the vehicle condition referenced by the vehicle a in the traffic situation illustrated in FIGS. 10A and 10B. In the examples in FIGS. 13A and 13B, the maximum number of vehicles to be referenced is 2. As an example of other conditions, by specifying a distance from the intersection, the vehicle being located in a part of the road and lane can be the vehicle condition to be referenced.

In the present embodiment, as illustrated in FIG. 11, a condition change determination unit 201 of the computer A determines whether or not the vehicle condition to be referenced has been changed as illustrated in FIG. 11 (operation S109), and the agent information request unit 106 transmits a request to send the vehicle information satisfying the condition to the computer B when the condition has been changed (operation S105).

As illustrated in FIG. 12, when the agent information request reception unit 107 determines whether or not there is a request to send the vehicle information to the computer B (operation S204), and if there is the request to send, the computer B accepts the request to send the vehicle information (operation S201). If the request to send the vehicle information is received, the referenced agent selection unit 108 updates the vehicle condition to be referenced (operation S205). Otherwise, it selects the vehicle satisfying the condition using the condition previously received from the computer A (operation S202).

Since the movement state (running state) of a vehicle changes with time every moment, it is preferable that a request to send the agent information is transmitted every time at specified intervals if the information about the vehicles within a specified distance is to be acquired from a vehicle as in the first embodiment. However, since the behavior of a vehicle is updated at a short time interval (for example, several milliseconds through several hundreds of milliseconds), there is the possibility that the traffic increases by the communication occurring at a request for the agent information. Therefore, as in the present embodiment, the increase of the traffic can be suppressed by transmitting a request for the agent information only when the vehicle condition to be referenced changes.

Third Embodiment

The configuration of the system of each computer according to the third embodiment is similar to the configuration illustrated in FIG. 9 according to the second embodiment. In the present embodiment, as in the first embodiment, the example of the distributed process by the computer A and the computer B is described below. It is assumed that the allocating state of the space to be simulated is the same as that in the first embodiment.

Figure 14A:
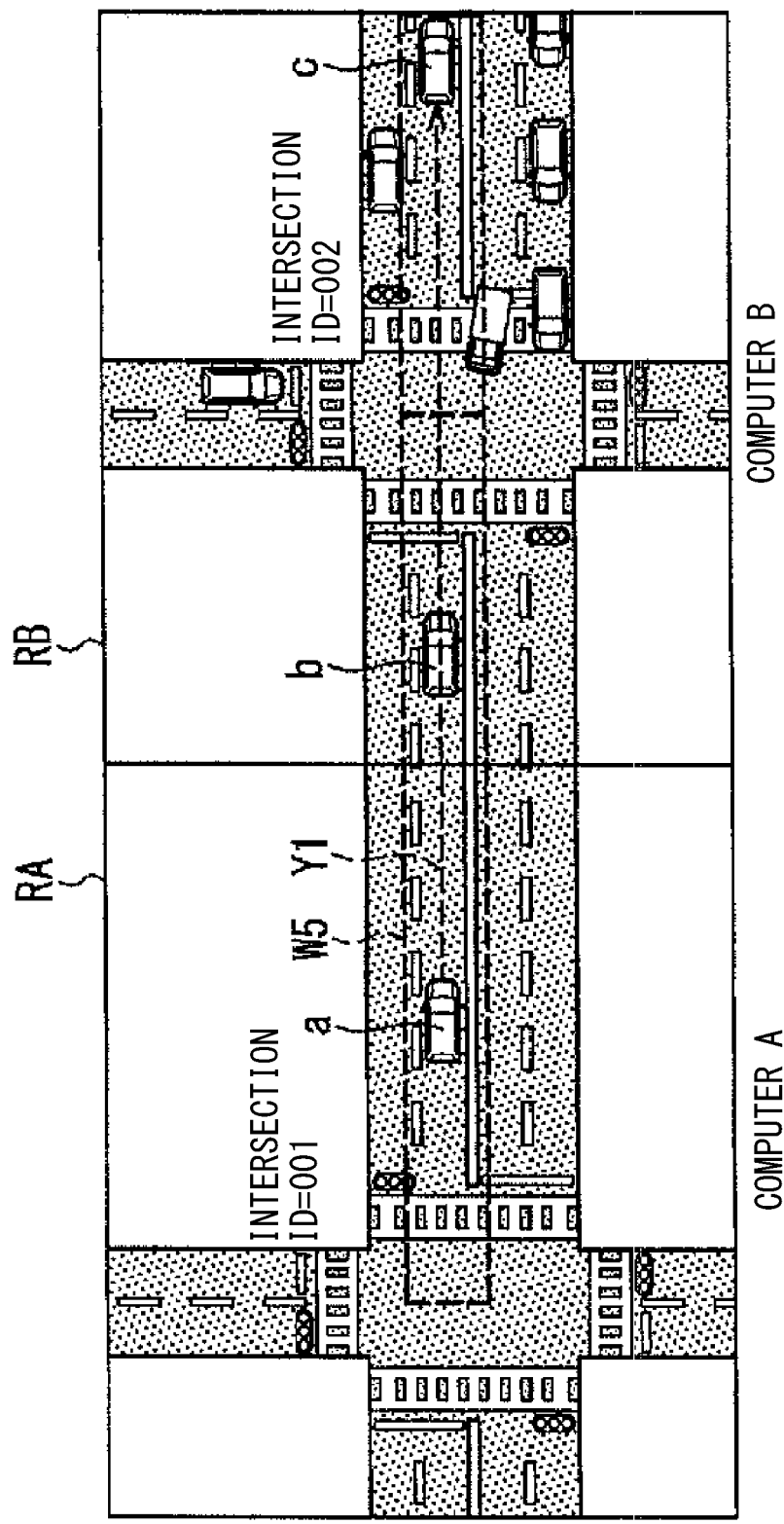
FIGS. 14A and 14B are examples of the traffic state according to the third embodiment.
Figure 14B:
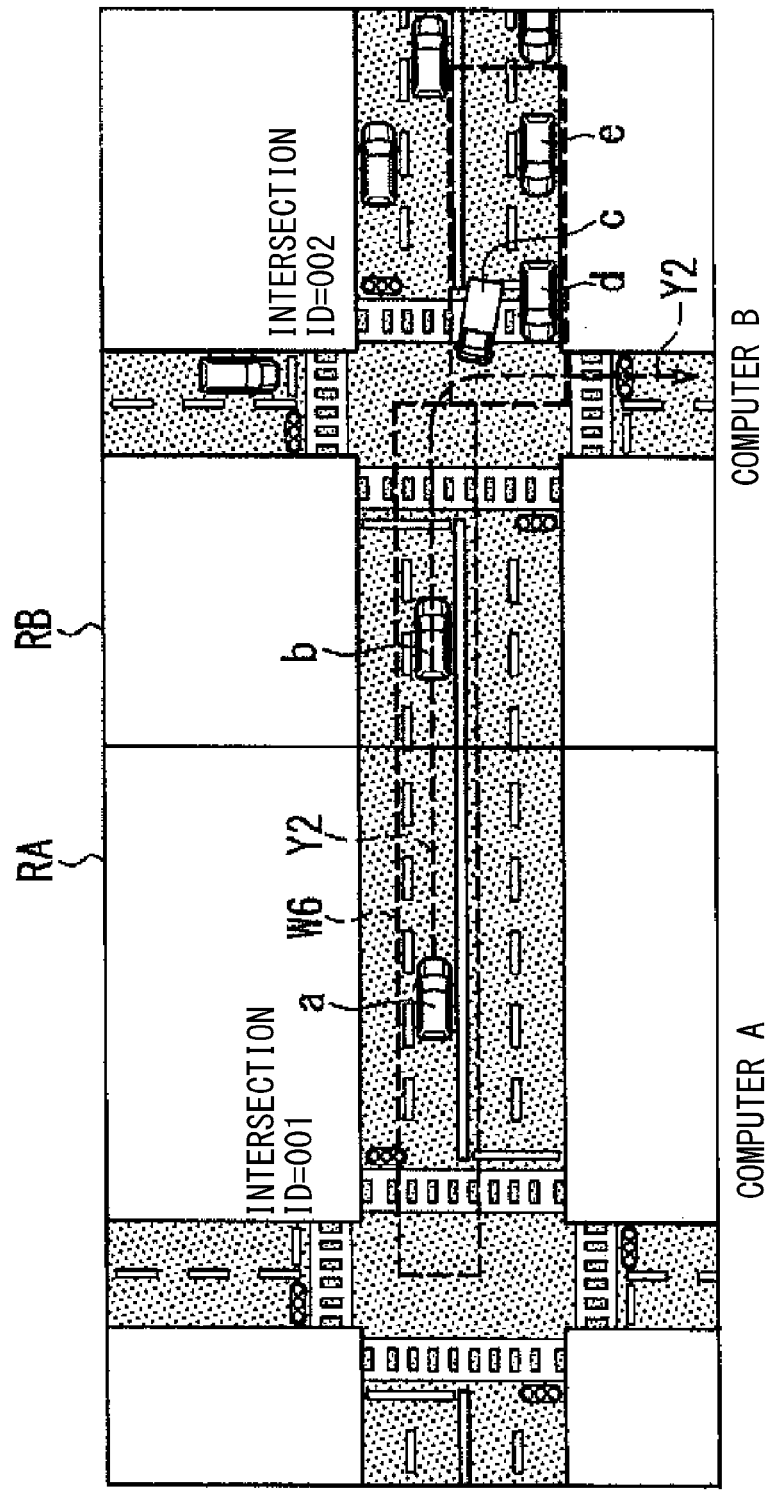

In the present embodiment, two cases of traffic situation illustrated in FIGS. 14A and 14B are exemplified. In the traffic situation illustrated in FIG. 14A, the vehicle a runs along the straight route through the intersection 002 (route indicated by the arrow Y1) while in the traffic situation illustrated in FIG. 14B, the vehicle a runs along the route turning right at the intersection 002 (route indicated by the arrow Y2). In the traffic simulator according to the present embodiment, the process on the calculation resources on the sides of transmitting and receiving the agent information is similar to that according to the second embodiment, and the processes are illustrated in FIGS. 11 and 12. FIGS. 15A and 15B are examples of the data of the vehicle condition referenced by the vehicle a in each traffic situation illustrated in FIGS. 14A and 14B. In the traffic situation illustrated in FIG. 15A, the vehicle on the same road and lane and the vehicle on the road and lane preceding the intersection 002 are the vehicle condition to be referenced. The vehicles b and c are the vehicles satisfying the condition. On the other hand, in FIG. 15B, the vehicle on the same road and lane and the vehicle located on the opposing road and within 20 m from the intersection 002 are the vehicle condition to be referenced. The vehicles b, c, d, and e are the vehicles satisfying the condition.

Thus, the condition determination unit 104 determines the vehicle condition to be referenced depending on the route of the vehicle (operation S102). If the route of the vehicle is changed during driving, the change determination unit 201 detects that the vehicle condition to be referenced has changed (operation S109), and the agent information request unit 106 transmits a request to send the vehicle information satisfying the condition (operation S105). For example, in the example illustrated in FIG. 14A, the route Y1 of the vehicle a runs straight through the intersection 002. That is, the route Y1 leads from the intersection 001 to the intersection 102 (not illustrated in the attached drawings). In this case, the condition determination unit 104 accesses the data illustrated in FIG. 5A, acquires the vehicle condition to be referenced, and requests the computer B to send the vehicle information about the vehicles b and c satisfying the acquired condition. In this case, for example, when the route of the vehicle a changes to the route Y2 (that is, to the route from the intersection 001 to the intersection 003) as illustrated in FIG. 14B, the condition determination unit 104 accesses the data illustrated in FIG. 5B, and acquires the vehicle condition to be referenced. The condition determination unit 104 requests the computer B to send the vehicle information about the vehicles b, c, d, and e satisfying the acquired condition.

As in the present embodiment, the vehicle to be referenced can be limited by considering the route of the vehicle, thereby suppressing the transmission and reception of unnecessary vehicle information.

Fourth Embodiment

The system configuration of each computer according to the present embodiment can be similar to that according to the second embodiment (refer to FIG. 9). The process performed on the calculation resources on the receiving and transmitting sides of the agent information can also be similar to that according to the second embodiment (refer to FIGS. 11 and 12 respectively).

In the present embodiment, the condition determination unit 104 determines the vehicle condition to be referenced depending on the driving behavior of the driver (operation S102). The driving behavior of the driver can be, for example, a free-crusing, a car-following, a braking, a stoping, a lane changing to the righte, a lane changing to the left, a right turn, a left turn, etc. Normally, a driver continues driving by switching the driving behaviors. The condition determination unit 104 can perform a simulation closer to the real conditions by changing the vehicle condition to be referenced in each driving behavior of the driver. When the driving behavior of the driver is switched, the change determination unit 201 detects that the vehicle condition to be referenced has been changed (operation S109), and the agent information request output unit 105 transmits the request to send the vehicle information satisfying the condition (operation S105).

FIGS. 16A through 16H are examples of the vehicle to be referenced in each driving behavior. Described below is the vehicle condition to be referenced in each driving behavior of the driver of the vehicle a in the attached drawings. However, the vehicle condition to be referenced is not limited to what is described here. The vehicle condition to be referenced is expressed by a combination of the road and lane on which the vehicle is located, the range, the number of vehicles, etc. as in the above-mentioned embodiments, but the descriptions are omitted here.

Figure 16A:
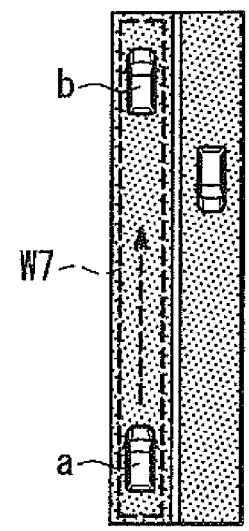
FIGS. 16A through 16H are examples of the vehicle condition referenced in the driving behavior according to the fourth embodiment.

FIG. 16A is an example of the case of a free-crusing. The free-crusing is a driving behavior in which the driver drives at any speed when there is no preceding vehicle, or when it is running apart from other vehicles at more than a specified distance. In the case of the free-crusing, the condition determination unit 104 can determine the vehicle condition located in a specified range preceding the vehicle a and closest to the vehicle a as the vehicle condition to be referenced. In the example in FIG. 16A, the vehicle b in the range W7 before the vehicle a satisfies the condition.

Figure 16B:
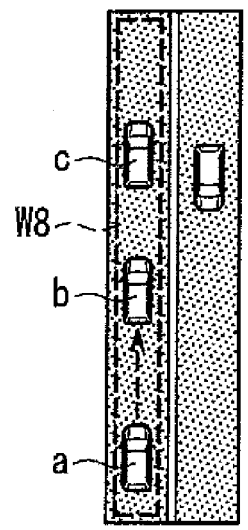

FIG. 16B is an example of the case of the car-following. The car-following is a driving behavior that a vehicle is controlled so that it keeps a following distance with the preceding vehicle when there is the preceding vehicle in a specified range. Normally, since it is assumed that a driver considers the behaviors of several preceding vehicles, the condition determination unit 104 can determine the condition of several (two, for example) vehicles in a specified range preceding the vehicle a and with the closer vehicle as the vehicle condition to be referenced. In the example in FIG. 16B, the two vehicles b and c in the range W8 preceding the vehicle a satisfy the condition.

Figure 16C:
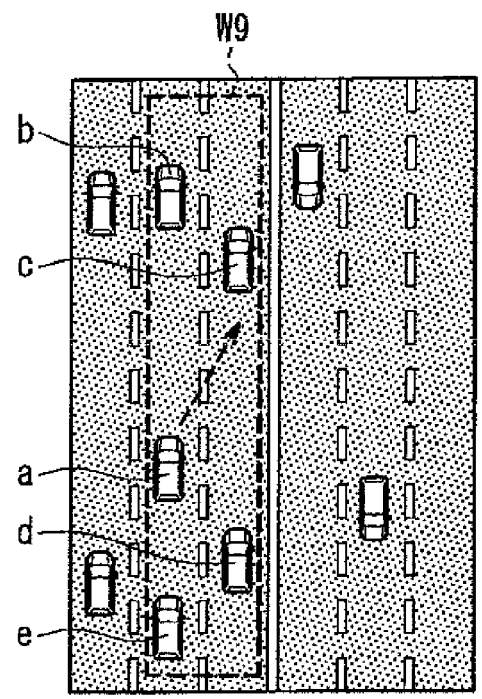
Figure 16D:
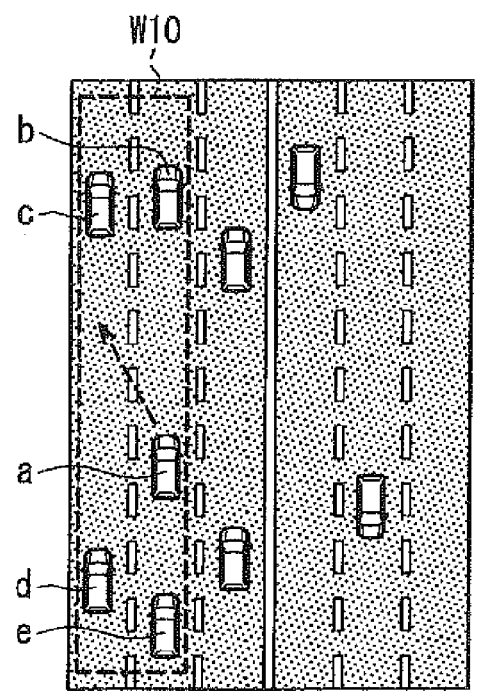

FIGS. 16C and 16D are examples of a lane changing to the right and a lane changing to the left respectively. The lane changing to the right and the lane changing to the left are driving behaviors of moving to a adjacent lane when there is sufficient space on the adjacent lane. Normally, since it is assumed that a driver considers the behaviors of the surrounding vehicles running on the current lane and the change-to lane, the condition determination unit 104 can determine the condition of the closest vehicles preceding and subsequent to the vehicle a on the current lane and the change-to lane within a specified range from the vehicle a as the vehicle condition to be referenced. In the examples illustrated in FIGS. 16C and 16D, in the vehicles in the range W9 and W10 preceding and subsequent to the vehicle a, the two closest vehicles c and d preceding and subsequent to the vehicle a satisfy the condition.

Figure 16E:
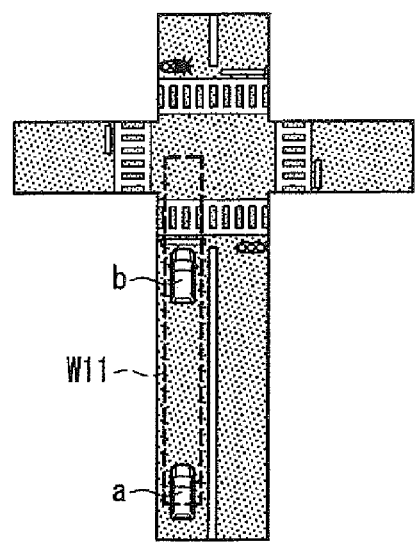

FIG. 16E is an example of the case of a braking. The braking is a driving behavior that a vehicle is controlled so that the vehicle can stop at a target stop position. In the case of the braking according to the red traffic signal, the target stop position is before the stop line. Normally, when a driver is to stop before the stop line, it is assumed that the driver does not consider the behaviors of the vehicles farther than the intersection. Therefore, the condition determination unit 104 determines the condition of several (two, for example) vehicles between the vehicle a and the forward intersection, and closest to the vehicle a as the vehicle condition to be referenced. In the example illustrated in FIG. 16E, the closest vehicle b in the vehicles in the range W11 between the vehicle a and the forward intersection satisfies the condition.

Figure 16F:
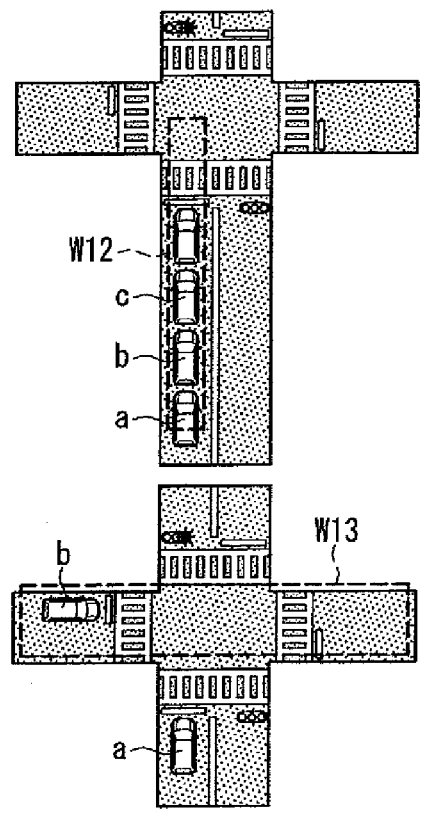

FIG. 16F is an example of the case of the stopping. The stopping is a driving behavior of continuing the stop at the current position. In the case of the stopping according to a red signal etc., the vehicle to be referenced depends on the subsequent or leading vehicle. In the case of the subsequent vehicle, since it is assumed that the driver perceives several preceding vehicles which have stopped to determine to start or keep stopping, the condition determination unit 104 can determine the condition of several (two, for example) vehicles closest to the vehicle a and located between the vehicle a and the forward intersection as the vehicle condition to be referenced. In the case of the leading vehicle, since it is assumed that the driver perceives vehicles approaching the intersection, the condition determination unit 104 can determine the condition of several vehicles closest to the intersection and in the intersection before the vehicle a or in a specified range from the intersection on the road and lane leading to the intersection as the vehicle condition to be referenced.

In the example illustrated in the upper part in FIG. 16F, the two closest vehicles b and c in the vehicles in the range W11 from the vehicle a to the intersection satisfy the condition. In the example illustrated in the lower part in FIG. 16R, the closest vehicle b in the intersection forward the vehicle a and in the specified range W13 from the intersection satisfies the condition.

Figure 16G:
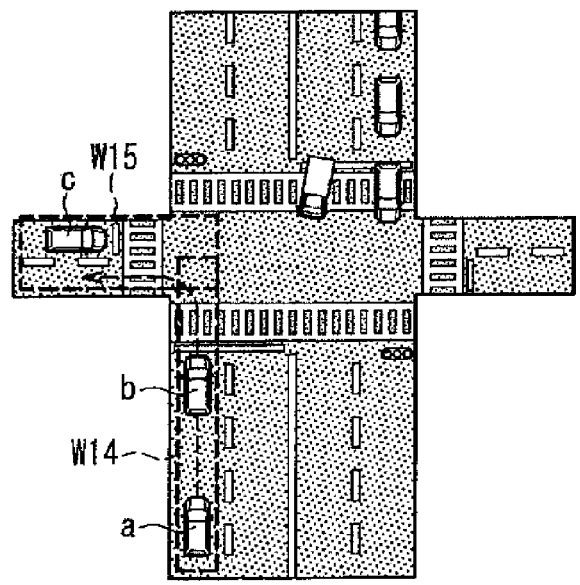
Figure 16H:
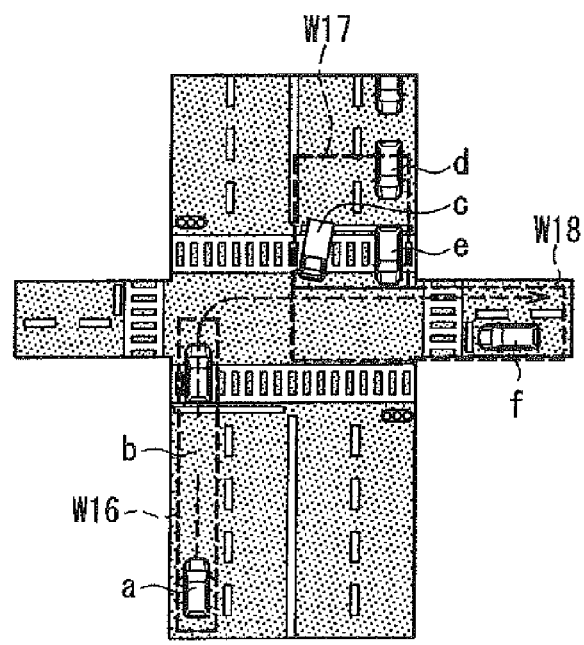

FIGS. 16G and 16H are examples in the cases of a right turn and a left turn respectively. The right turn and the left turn are the driving behaviors of making a turn at an intersection etc., and moving to the road crossing the current road. In the case of the right turn, it is assumed that a driver considers the behaviors of the vehicle in the intersection, the vehicle approaching the intersection from the opposite direction, and the vehicle on the road to which the driver is making a right turn. Therefore, the condition determination unit 104 can determine the condition of several (two, for example) closest vehicles from the vehicle a and located between the vehicle a and the forward intersection, or several closest vehicles from the intersection and located in a specified range from the intersection on each lane in the opposite direction, or several closest vehicles from the intersection and located in a specified range from the intersection on the road to which the driver is making a right turn as the vehicle condition to be referenced. In the case of the left turn, it is assumed that a driver considers the behaviors of the vehicle in the intersection, and the vehicle on the road to which the driver is making a left turn. Therefore, the condition determination unit 104 can determine the condition of several (two, for example) closest vehicles from the vehicle a and located between the vehicle a and the forward intersection, or several closest vehicles from the intersection and located in a specified range from the intersection on the road to which the driver is making a left turn as the vehicle condition to be referenced. Not only a vehicle to be referenced but also a walker on the crosswalk nearby may be referenced.

FIG. 16G is an example of the case of the left turn, and the vehicle b closest to the vehicle a and located in the range W14 between the vehicle a and the forward intersection, or the vehicle c closest to the intersection and located in the specified range W15 from the intersection on the road to which the driver is making a left turn satisfy the condition. FIG. 16H is an example of the case of a right turn, and the vehicle b closest to the vehicle a and located in the range W16 between the vehicle a and the forward intersection, or two vehicles c and e closest to the intersection and located in the specified range W17 from the intersection on the opposite lanes, or the vehicle f closest to the intersection and located in the specified range W18 from the intersection on the road to which the driver is making a right turn satisfy the condition.

According to the present embodiment, the vehicle to be referenced can be limited by considering the driving behavior of the driver, thereby suppressing the transmission and reception of unnecessary vehicle information.

Fifth Embodiment

Figure 17:
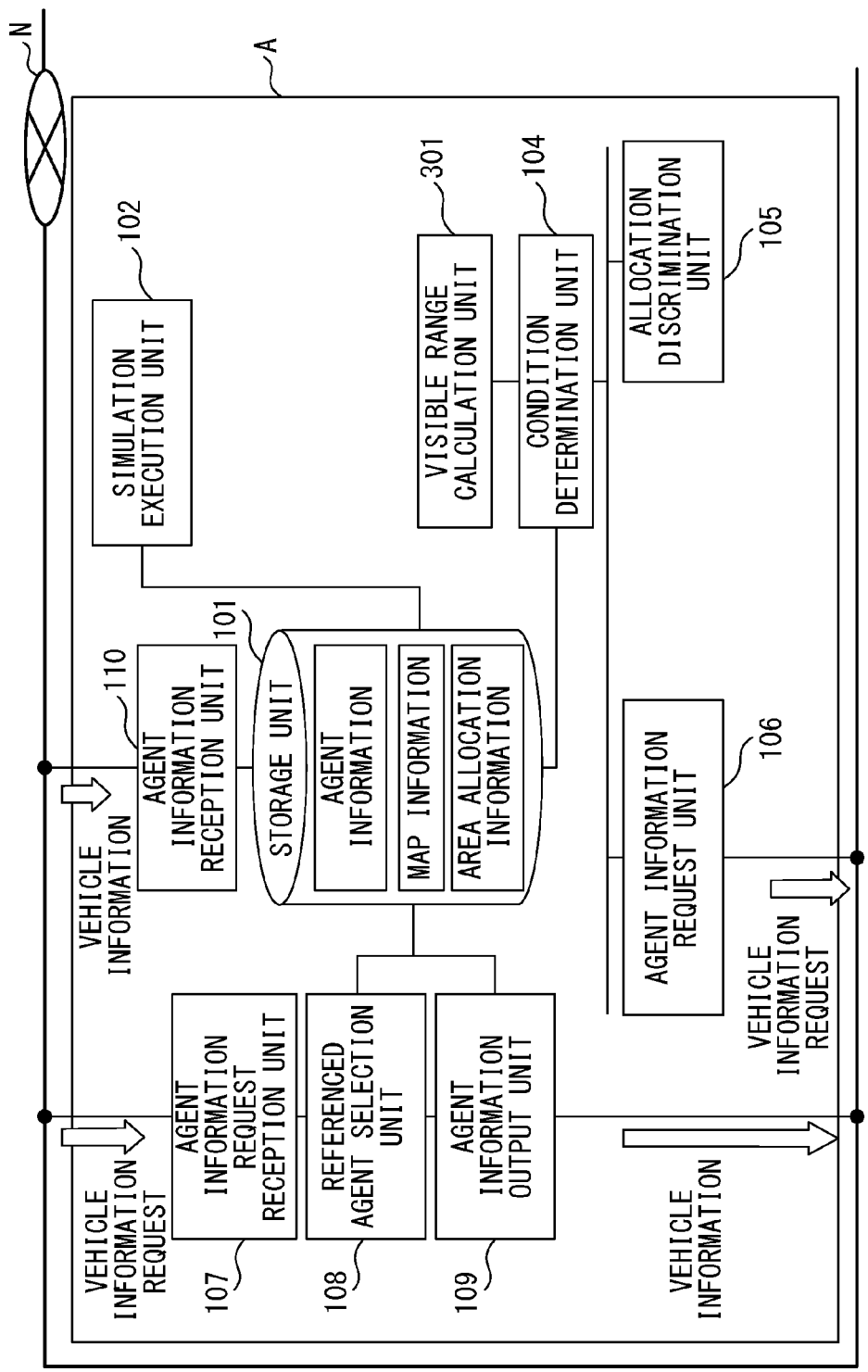
FIG. 17 is a block diagram of the functions indicating the examples of the configuration of the computer according to the fifth embodiment.

FIG. 17 is a block diagram of the function indicating the example of the system configuration of the computer according to the fifth embodiment. In the present embodiment, as in the embodiment 1, the case in which the distributed process is performed using the computers A and B is described. The process of the calculation resources on the receiving side (computer A) and the transmitting side (computer B) of the agent information can be performed as in the first embodiment (refer to FIGS. 6 and 7 respectively).

In the present embodiment, the condition determination unit 104 determines the vehicle condition to be referenced depending on the visible range for the driver (operation S102). In this case, a visible range calculation unit 301 calculates the visible range for the driver, and sets the condition so that the vehicle located outside the visible range for the driver can be excluded from the vehicles to be referenced. The visible range for the driver depends on the direction of the head of the driver, the existence of the obstacles such as surrounding vehicles, buildings, etc. The visible range calculation unit 301 can also precisely calculate the visible range for the driver by considering the direction of the head of the driver, the positions and the sizes of the surrounding vehicles and buildings simulated by the simulation execution unit 102. Otherwise, the visible range calculation unit 301 can calculate them in a simpler method to reduce the computational complexity. For example, instead of considering the direction of the head of the driver, the direction of a vehicle and the driving behavior at the time point can be used. In addition, instead of considering the positions and the sizes of the surrounding vehicles and buildings, the vehicle types and distances of the surrounding vehicles, the map information about whether or not the intersection is clearly viewed, etc. can be used.

Figure 18A:
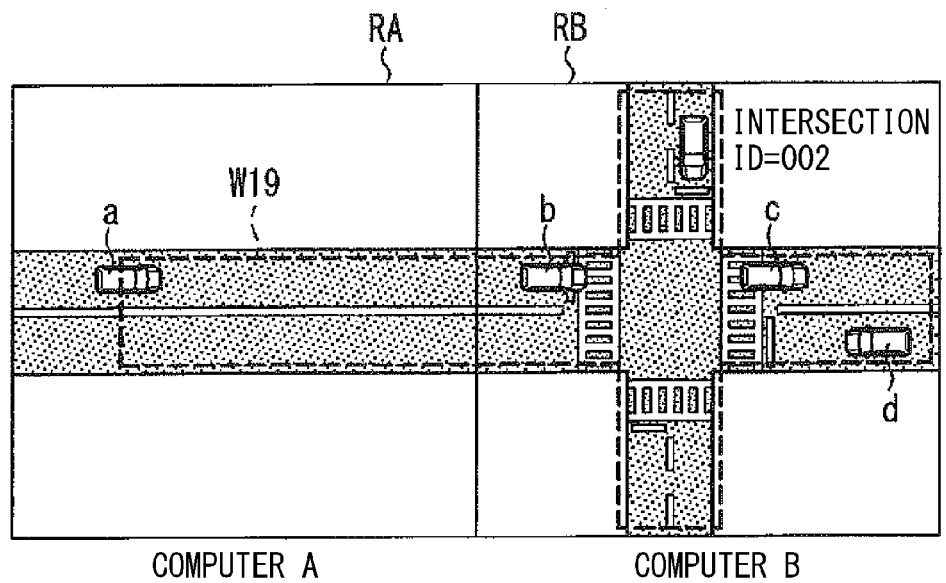
Figure 18C:
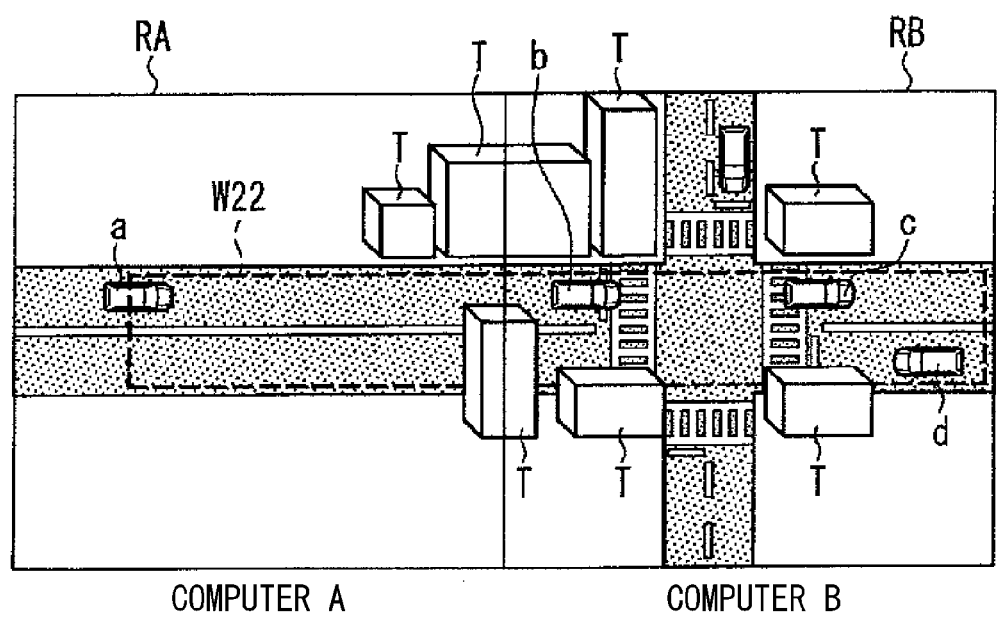

An example of the operation according to the present embodiment is described below by exemplifying the case of the traffic situation illustrated in FIGS. 18A through 18C. Described below is the vehicle condition to be referenced by the vehicle a illustrated in the figures. However, the vehicle condition to be referenced is only an example, and is not limited to the descriptions below. In FIGS. 18A through 18C, the frames W7 through W9 indicate the respective ranges in which the vehicle to be referenced by the vehicle a can be located. The vehicle condition to be referenced is expressed by the road and lane on which the vehicle can be located, and the combination of the range, the number of vehicles, etc. as in the embodiments above. It is assumed that the driver of the vehicle a can visually confirm the forward direction of the vehicle at 180°.

In the example of the traffic situation illustrated in FIG. 18A, the driver of the vehicle a is the range W19 capable of visually recognizing the current straight road and the road crossing it at the intersection 002, and the condition determination unit 104 can determine the location on the roads as the vehicle condition to be referenced. In this example, the vehicles b through e satisfy the condition.

In the example of the traffic situation illustrated in FIG. 18B, a large vehicle is running before the vehicle a. Therefore, the driver of the vehicle a cannot visually confirm the traffic situation beyond the large vehicle b. It is also hard to visually confirm the opposite lane beyond the intersection 002. Accordingly, the condition determination unit 104 can add non-existence on the current road and on the opposite lane beyond the intersection 002 to the vehicle condition to be referenced. That is, in the example in FIG. 18B, on the current straight line and on the road crossing from the right, the vehicle c located in the range W20 excluding the area interrupted by the large forward vehicle b and located in the specified range W21 of the road crossing from the left at the intersection satisfies the condition.

In the example of the traffic situation illustrated in FIG. 18C, there are buildings around the intersection 002. Therefore, the driver of the vehicle a cannot visually confirm the vehicles on the road crossing the current road. Accordingly, the condition determination unit 104 can add non-existence on the road crossing the current road to the vehicle condition to be referenced. In the example illustrated in FIG. 18C, the vehicles in the range of the field interrupted by the building T do not satisfy the condition. That is, the vehicles b, c, and d located in the specified range W22 on the current straight lane before the vehicle a satisfy the condition.

By considering the visible range for the driver as in the present embodiment, a vehicle to be referenced can be limited, thereby suppressing the transmission and reception of unnecessary vehicle information.

Thus, in the embodiments described above, each computer selects necessary agent information for the simulation of the behavior of an agent based on the reference range of each agent, and issues a request to another computer, thereby suppressing the transmission and reception of unnecessary agent information among the computers, and suppressing an increase of traffic.

The simulation according to the embodiments above can be applied to a micro traffic simulator for simulating the behavior of each agent in a parallel distribution environment using a plurality of computers, but the application example is not limited to the examples above.

REFERENCE NUMERALS 101 storage unit
102 simulation execution unit
103 display unit
104 condition determination unit
105 allocation discrimination unit
106 agent information request unit
107 agent information request reception unit
108 referenced agent selection unit
109 agent information output unit
110 agent information reception unit
201 condition change determination unit
301 visible range calculation unit

What is claimed is:

1. A simulator which realizes a simulation of behaviors of a plurality of agents located in a virtual space by distributed processing using a plurality of computers,
the simulator of each of the computers being accessible to
a storage unit storing map information about a target area allocated to the computer itself in the virtual space, agent information including information relating to at least a position of an agent, and area allocation information indicating an area allocated to other computers, the simulator comprising,
a simulation execution unit configured to simulate the behavior of each agent in the target area by referring to the agent information about other agents, and to repeatedly perform a process of updating the agent information about each agent;
a condition determination unit configured to determine a condition of a reference agent for reference in a process of simulating the behavior of each agent by the simulation execution unit based on a movement state of the agent in the target area obtained from the information about a position of the agent;
an allocation discrimination unit configured to discriminate another computer to which an area where the reference agent corresponding to the condition can be located is allocated using the area allocation information; and
an agent information acquisition unit configured to acquire the agent information about the reference agent satisfying the condition of the reference agent from the other computer discriminated by the allocation discrimination unit and to store the acquired information in the storage unit.

2. The simulator according to claim 1, wherein
the agent information acquisition unit comprises,
an agent information request unit configured to output the condition of the reference agent to be referenced to the other computer discriminated by the allocation discrimination unit;
an agent information reception unit configured to receive agent information from the other computer to which the agent information request unit outputs the condition, and to store the information in the storage unit; and
the simulator further comprises,
an agent information request reception unit configured to receive from the other computer the condition of the agent to be referenced by the simulation execution unit of the other computer;
a referenced agent selection unit configured to select from the storage unit the agent information satisfying the condition received by the agent information request reception unit; and an agent information output unit configured to transmit to the other computer the agent information selected by the referenced agent selection unit.

3. The simulator according to claim 2, wherein
if the agent information request reception unit does not accept the condition of the agent from the other computer within a specified time period after a previous reception, the referenced agent selection unit selects an agent satisfying the previously accepted condition.

4. The simulator according to claim 1, further comprising
a change determination unit configured to determine whether or not the condition of the reference agent which is determined by the condition determination unit has been changed from the previously determined condition, wherein
when the change determination unit determines that the condition has been changed, the agent information acquisition unit acquires agent information about the reference agent satisfying the condition from the other computer.

5. The simulator according to claim 1, further comprising a visible range calculation unit configured to calculate a visible range for an agent, wherein the condition determined by the condition determination unit includes a condition of an agent located in the visible range calculated by the visible range calculation unit.

6. The simulator according to claim 1, wherein:
the condition determination unit determines the condition of the reference agent to be referenced on a plurality of agents in the target area, and calculates a logical sum of the condition of the reference agent in the plurality of agents; and
the allocation discrimination unit determines another computer allocated an area in which the reference agent corresponding to the logical sum of the condition can be located using the area allocation information.

7. The simulator according to claim 1, wherein:
the agent is a vehicle;
the condition determination unit determines the condition of the reference agent based on at least one of position coordinates, a speed, a road of a current run, a lane of a current run, a route, a driving behavior of a driver as a movement state of an agent.

8. The simulator according to claim 7, wherein
the driving behavior of the driver is at least one of a freecruising, a car-following, a braking, a stopping, a lane changing to the right, a lane change to the left, a right turn, and a left turn.

9. The simulator according to claim 1, wherein:
the condition of the reference agent which is determined by the condition determination unit includes information about a reference range in the virtual space to be referenced by the simulation execution unit; and
the referenced agent selection unit selects the agent information about the agent located in the reference range.

10. The simulator according to claim 1, wherein
the condition determined by the condition determination unit includes information about a specific road range or a specific lane on which the reference agent can be located.

11. The simulator according to claim 1, wherein
the condition determined by the condition determination unit includes information about a range in which an agent can be located or a number of reference agents.

12. A computer used in realizing a simulation of behaviors of a plurality of agents located in a virtual space by distributed processing using a plurality of computers, the computer comprising:
a storage unit configured to store map information about a target area allocated to the computer itself in the virtual space, agent information including information relating to at least a position of an agent, and area allocation information indicating an area allocated to other computers;
a simulation execution unit configured to simulate the behavior of each agent in the target area by referring to the agent information about other agents, and to repeatedly perform a process of updating the agent information about each agent;
a condition determination unit configured to determine a condition of a reference agent for reference in a process of simulating the behavior of each agent by the simulation execution unit based on a movement state of the agent in the target area obtained from the information about a position of the agent;
an allocation discrimination unit configured to discriminate another computer to which an area where the reference agent corresponding to the condition can be located is allocated using the area allocation information; and
an agent information acquisition unit configured to acquire the agent information about the reference agent satisfying the condition of the reference agent from the other computer discriminated by the allocation discrimination unit and to store the acquired information in the storage unit.

13. A non-transitory computer-readable recording medium storing a simulation program for realizing a simulation of behaviors of a plurality of agents located in a virtual space by distributed processing using a plurality of computers, the simulation program directs each computer:
to access a storage unit storing map information about a target area allocated to the computer itself in the virtual space, agent information including information relating to at least a position of an agent, and area allocation information indicating an area allocated to other computers;
to simulate the behavior of each agent in the target area by referring to the agent information, and to repeatedly perform a process of updating the agent information about each agent;
to determine a condition of a reference agent for reference in the simulation of the behavior of each agent based on a movement state of the agent in the target area obtained from the information about a position of the agent;
to discriminate another computer to which an area where the reference agent corresponding to the condition can be located is allocated using the area allocation information; and
to acquire the agent information about the reference agent satisfying the condition from the other computer discriminated in the allocation discrimination.

14. A distributed simulation method performed by a computer to realize a simulation of behaviors of a plurality of agents located in a virtual space by a distributed process using a plurality of computers, each computer performing the method comprising:
accessing a storage unit storing map information about a target area allocated to the computer itself in the virtual space, agent information including information relating to at least a position of an agent, and area allocation information indicating an area allocated to other computers;

simulating the behavior of each agent in the target area by referring to the agent information, and repeatedly performing a process of updating the agent information about each agent;

determining a condition of a reference agent for reference in the simulating the behavior of each agent based on a movement state of the agent in the target area obtained from the information about a position of the agent;

discriminating another computer to which an area where the reference agent corresponding to the condition can be located is allocated using the area allocation information; and acquiring the agent information about the reference agent satisfying the condition from the other computer discriminated in the discriminating.

\* \* \* \* \*